(12) United States Patent
Okubo

(10) Patent No.: US 12,292,173 B2
(45) Date of Patent: May 6, 2025

(54) LAMP UNIT, AND VEHICLE LAMP FITTING

(71) Applicant: Ichikoh Industries, Ltd., Isehara (JP)

(72) Inventor: Yasuhiro Okubo, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/717,330

(22) PCT Filed: Dec. 12, 2022

(86) PCT No.: PCT/JP2022/045619
§ 371 (c)(1),
(2) Date: Jun. 6, 2024

(87) PCT Pub. No.: WO2023/106422
PCT Pub. Date: Jun. 15, 2023

(65) Prior Publication Data
US 2025/0035285 A1 Jan. 30, 2025

(30) Foreign Application Priority Data
Dec. 10, 2021 (JP) ................ 2021-201139

(51) Int. Cl.
*F21S 43/20* (2018.01)
*F21S 43/40* (2018.01)
(Continued)

(52) U.S. Cl.
CPC ... *F21S 43/26231* (2024.05); *F21S 43/26411* (2024.05); *F21S 43/402* (2024.05); *F21W 2103/60* (2018.01); *F21Y 2115/10* (2016.08)

(58) Field of Classification Search
CPC .......... F21S 43/26231; F21S 43/26411; F21S 43/402
(Continued)

(56) References Cited

U.S. PATENT DOCUMENTS 3,915,568 A * 10/1975 Yamada ............... G03B 21/132
353/38
11,976,800 B1 * 5/2024 Kaski ................. F21S 43/26411
(Continued)

FOREIGN PATENT DOCUMENTS

JP 2019-192349 A 10/2019
JP 2020-102332 A 7/2020
(Continued)

OTHER PUBLICATIONS

International Search Report mailed on Feb. 14, 2023 in PCT/JP2022/045619 filed on Dec. 12, 2022 (citing references 17-19 therein, 2 pages).

*Primary Examiner* — Bryon T Gyllstrom
(74) *Attorney, Agent, or Firm* — Oblon, McClelland, Maier & Neustadt, L.L.P.

(57) ABSTRACT

A lamp unit forms an irradiation pattern having a desired brightness distribution while efficiently using light from a light source. In the lamp unit, a light source unit including light sources, a condenser lens, a light shielding member (shade), and a projector lens are arrayed along a lamp unit axis. An incident surface has a curved incident surface section facing the light sources and an annular incident surface section surrounding the curved incident surface section. The condenser lens has a reflective surface surrounding the curved incident surface section. The light shielding member (shade) is disposed such that a light shielding reference point coincides with a lamp unit axis. The light sources are disposed with an emission light axis positioned above the lamp unit axis in the vertical direction. The condenser lens is disposed such that condenser lens axes are positioned above the lamp unit axis in the vertical direction.

10 Claims, 10 Drawing Sheets

(51) Int. Cl.
*F21W 103/60* (2018.01)
*F21Y 115/10* (2016.01)

(58) Field of Classification Search
USPC .......................................... 362/509
See application file for complete search history.

(56) References Cited

U.S. PATENT DOCUMENTS

2024/0392943 A1* 11/2024 Fischer .................. F21S 41/27
2025/0020299 A1* 1/2025 Paul ...................... F21S 41/143
2025/0035285 A1* 1/2025 Okubo ............... F21S 43/26411

FOREIGN PATENT DOCUMENTS

| JP | 2020-205237 A | 12/2020 |
| JP | 2021-111465 A | 8/2021 |
| JP | 2021-118119 A | 8/2021 |

\* cited by examiner

LAMP UNIT, AND VEHICLE LAMP FITTING

TECHNICAL FIELD

The invention relates to a lamp unit, and a vehicle lamp fitting.

BACKGROUND ART

There are proposed vehicle lamp fittings form irradiation patterns on road surfaces around vehicles by using lamp units (refer to PTL1, PTL2, and the like, for example). Such a conventional lamp unit forms an irradiation pattern by projecting, with a projector lens, the light from a light source through an irradiation slit in a light shielding member (shade), so that it is possible to inform a viewer of the intention represented by the irradiation pattern. In such a conventional lamp unit, light from a light source is guided to a light shielding member by a light guiding body (light guide) so that it is possible to efficiently use the light from the light source.

CITATION LIST

Patent Literature

PTL 1: Japanese Patent Laid-open No. 2020-102332
PTL 2: Japanese Patent Laid-open No. 2019-192349

SUMMARY OF THE INVENTION

Problems to be Solved by the Invention

However, in the conventional lamp unit, the light from a light source is diffused in the light guiding body to make a light flux distribution uniform on the light shielding member, and therefore it is difficult to adjust the light flux distribution on the light shielding member and to form an irradiation pattern having a desired brightness distribution.

An object of the disclosure, which has been made in consideration with the above-described issues, is to provide a lamp unit capable of forming an irradiation pattern having a desired brightness distribution and a vehicle lamp fitting including the lamp unit while efficiently using light from a light source.

Means for Solving the Problem

A lamp unit according to the disclosure includes: a light source unit that is provided with a plurality of light sources; a condenser lens that condenses the light from the light sources; a light shielding member that has an irradiation slit partially passing the light condensed by the condenser lens; and a projector lens that form an irradiation pattern by projecting the light passing the light shielding member, wherein the light source unit, the condenser lens, the light shielding member, and the projector lens are arrayed on the lamp unit axis, an incident surface of the condenser lens has a curved incident surface section facing the light sources in a condenser lens axial direction of the condenser lens, and an annular incident surface section surrounding the curved incident surface section, the condenser lens has a reflective surface surrounding the curved incident surface section, the light sources are disposed with an emission light axis positioned above the lamp unit axis in a vertical direction, and the condenser lens is disposed with the condenser lens axis positioned above the lamp unit axis in the vertical direction.

Effect of the Invention

According to lamp unit and a vehicle lamp fitting including the lamp unit of the disclosure, it is possible to form an irradiation pattern having a desired brightness distribution while efficiently using light from a light source.

MODE FOR CARRYING OUT THE INVENTION

Figure 1:
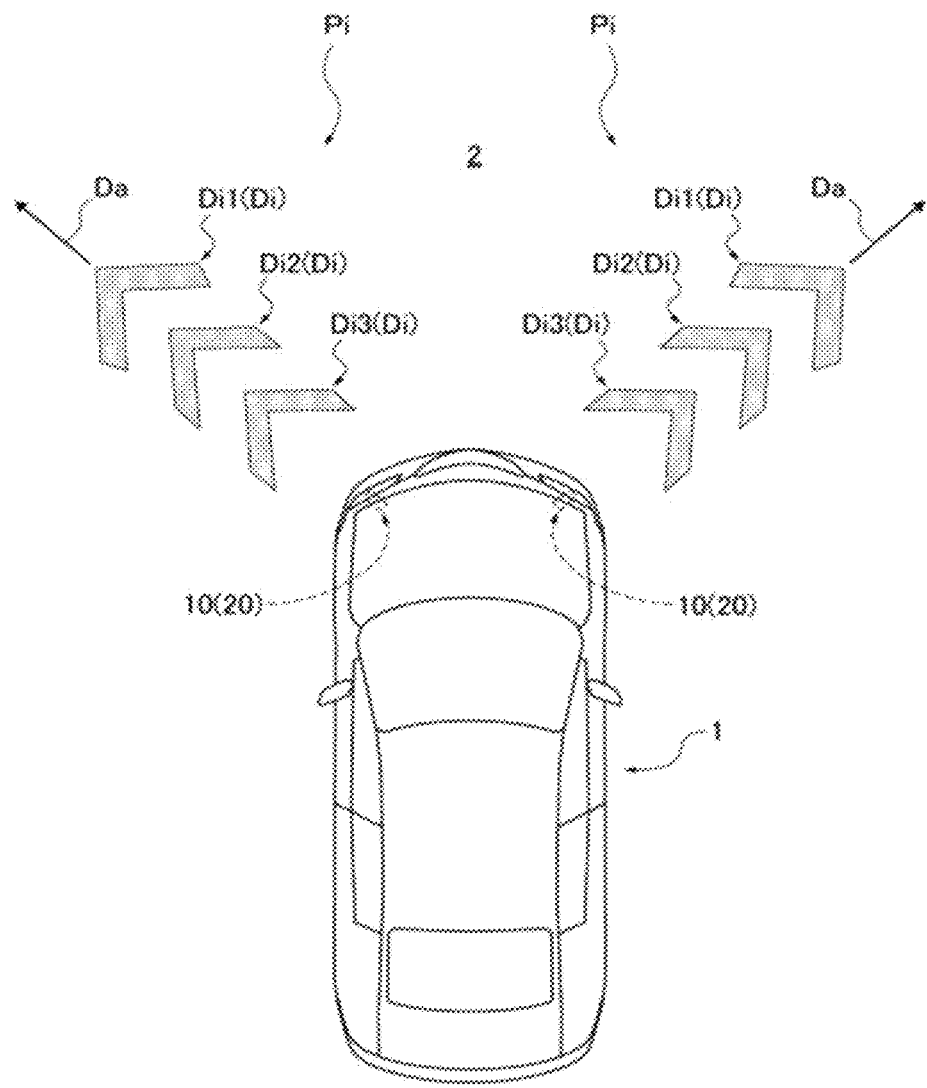
FIG. 1 is an explanatory diagram illustrating a state in which vehicle lamp fittings of a first embodiment according to the disclosure are mounted on a vehicle and each forms an irradiation pattern.
Figure 9:
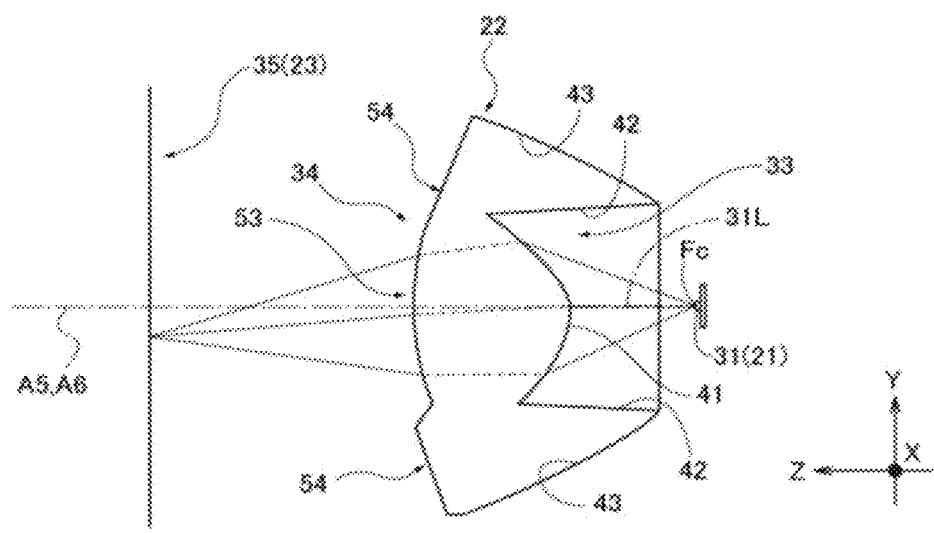
FIG. 9 is an explanatory view illustrating a state in which light passing through a condensing reference focal point from a light source on a longitudinal section (vertical section) is incident on a condenser lens from a curved incident surface section and travels to a shade (each slit section) in a lamp unit.
Figure 10:
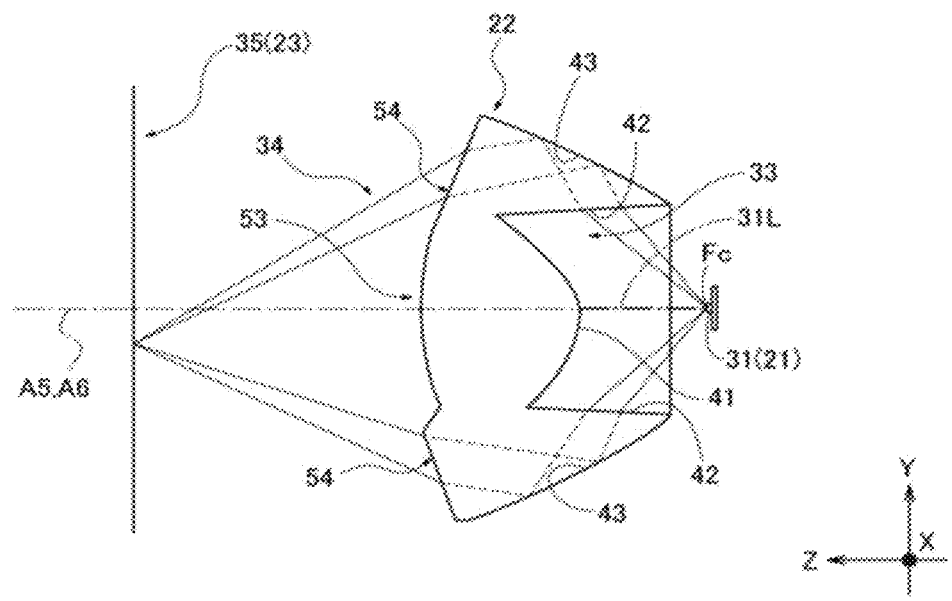
FIG. 10 is an explanatory view illustrating a state in which light passing through a condensing reference focal point from a light source on a longitudinal section (vertical section) is incident on a condenser lens from an annular incident surface section, is reflected by a reflective surface, and travels to a shade (each slit section) in a lamp unit.

Lamp units 20 and vehicle lamp fittings 10 will now be described with reference to the drawings as examples of lamp units and vehicle lamp fittings according to embodiments of the disclosure. In order to make it easier to understand how the vehicle lamp fittings 10 are provided, FIG. 1 illustrates the vehicle lamp fittings 10 with respect to a vehicle 1, with emphasis on the vehicle lamp fittings 10, which do not necessarily coincide with the actual appearance. In FIGS. 9 and 10, hatching indicating a cross section in a condenser lens is omitted, and a shade frame portion of a shade is omitted, in order to make it easier to understand how light travels.

First Embodiment

Each vehicle lamp fitting 10 (lamp unit 20) of the first embodiment will be described with reference to FIGS. 1 to 16. As illustrated in FIG. 1, the vehicle lamp fitting 10 of the first embodiment is used as lamp fitting for the vehicle 1, such as an automobile, and is provided in a front section of the vehicle 1 to form an irradiation pattern Pi on a peripheral road surface 2 in front of the vehicle 1, separately from a headlight provided in the vehicle 1. The periphery in front of the vehicle 1 always includes a proximity area closer to the vehicle 1 than a headlight area irradiated by the headlight provided in the vehicle 1, and may partially include the headlight area. The vehicle lamp fitting 10 may also form the irradiation pattern Pi on a peripheral road surface 2 behind and on the lateral side of the vehicle 1, and is not limited to the configuration of the first embodiment.

Figure 2:
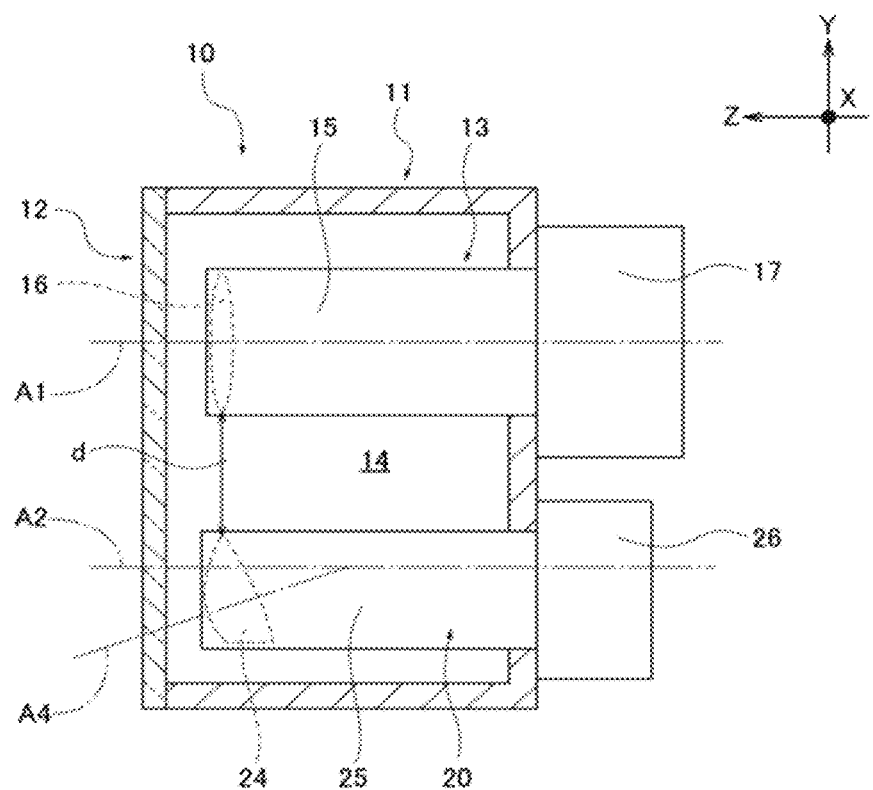
FIG. 2 is an explanatory diagram illustrating a configuration of a vehicle lamp fitting.

In the first embodiment, the vehicle lamp fitting 10 is composed of a signal lamp such as a turn lamp or a back lamp provided in the vehicle 1. In the first embodiment, a pair of vehicle lamp fittings 10 is provided as turn lamps on the left and right front sides of the vehicle 1. The vehicle lamp fitting 10 may be composed of another signal lamp, for example, a clearance lamp, a back lamp (stop lamp), or a tail lamp, and is not limited to the first embodiment. The two vehicle lamp fittings 10 basically have equal configurations, except that positions to be mounted and positions where the irradiation patterns Pi are formed are different. Therefore, one vehicle lamp fitting 10 will be described below. As illustrated in FIG. 2, the vehicle lamp fitting 10 includes a lamp housing 11, a lamp lens 12, a signal lamp unit 13, and the lamp unit 20.

The lamp housing 11 is composed of an opaque material such as a colored or painted resin material, and has an opened front side and a blocked rear side. The lamp lens 12 is composed of a light transmissive member such as a transparent resin member or a glass member, and can cover the open front end of the lamp housing 11. The lamp lens 12 is fixed in the opening part of the lamp housing 11 in a sealed state to ensure watertightness. A lamp chamber 14 is defined by the lamp housing 11 and the lamp lens 12.

In the lamp chamber 14, the signal lamp unit 13 and the lamp unit 20 are disposed to be fixed to the lamp housing 11 or the like. The signal lamp unit 13 is composed by arranging optical members such as light sources (not illustrated) on a signal lamp unit axis A1 in a signal lamp housing 15; a signal-lamp light-emitting portion 16 is provided at a front end portion on the signal lamp unit axis A1; and a signal-lamp heat-radiating portion 17 is provided at a rear end portion. The signal lamp unit 13 is appropriately turned on and off by being supplied with electric power from a lighting control circuit. In the first embodiment, since the signal lamp unit 13 is a turn lamp, the signal lamp unit 13 blinks at a constant time interval when turned on. The signal lamp unit 13 is positioned such that the signal lamp unit axis A1 is parallel to the road surface 2, and persons around the vehicle 1 are highly visible.

The lamp unit 20 is provided below the signal lamp unit 13. In the following description, in the lamp unit 20 in which a lamp unit axis A2 is parallel to the signal lamp unit axis A1, a direction in which the lamp unit axis A2 extends is referred to as an axial direction (denoted by Z in the drawings), a direction perpendicular to the axial direction when the axial direction extends along the horizontal plane is referred to as a vertical direction (denoted by Y in the drawings), and a direction (horizontal direction) orthogonal to the axial direction and the vertical direction is referred to as a width direction (denoted by X in the drawings) (see FIG. 2, etc.).

Figure 3:
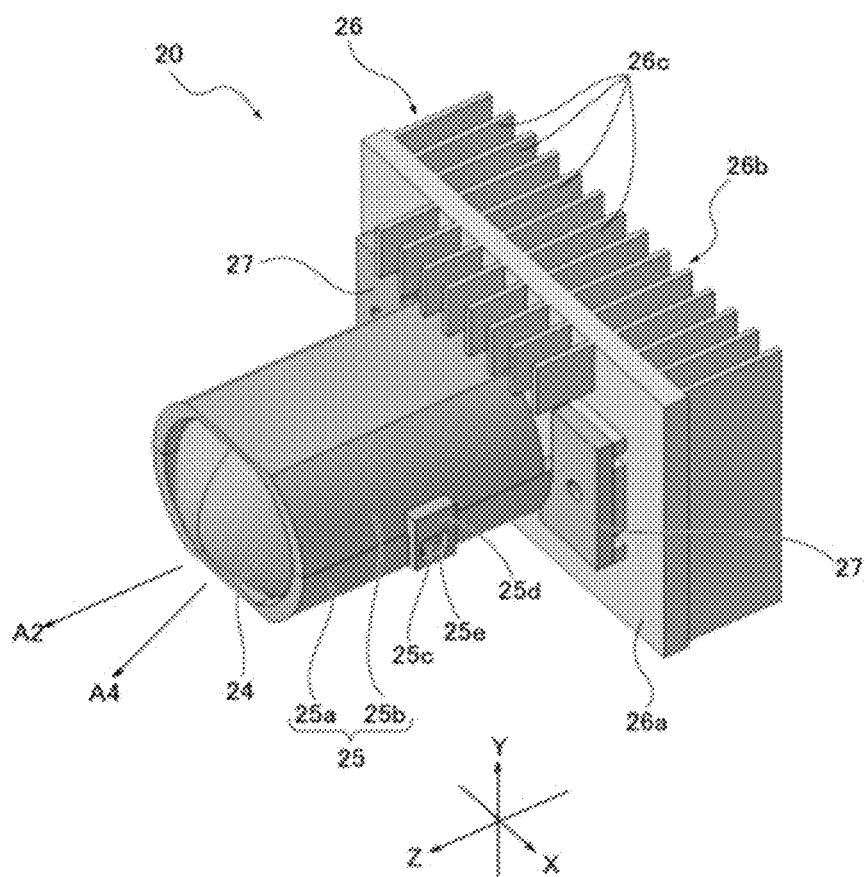
FIG. 3 is an explanatory diagram illustrating a configuration of a lamp unit of a vehicle lamp fitting.
Figure 4:
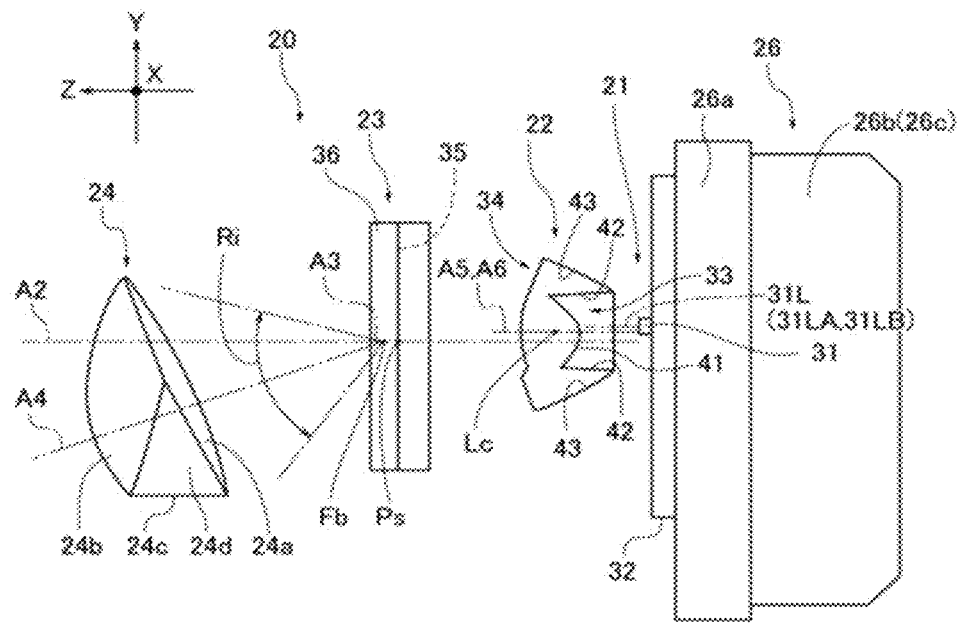
FIG. 4 is an explanatory diagram illustrating a configuration of a lamp unit with a housing omitted.

As illustrated in FIGS. 3 and 4, the lamp unit 20 includes a light source unit 21, a condenser lens 22, a shade 23, and a projector lens 24, which are housed in a light source housing 25 so as to be positioned on the lamp unit axis A2, and constitutes a projector-type road-surface projecting unit that serves as a single projecting optical system. The light source housing 25 includes a semi-cylindrical lower member 25a and a semi-cylindrical upper member 25b. In a state where the above-described members (22 to 24) are installed on the lower member 25a, the lower member 25a and the upper member 25b are fitted to each other, and the light source housing 25 is attached to an installation base portion 26. In the light source housing 25, a central axial line of the cylindrical shape formed by the lower member 25a and the upper member 25b fitted to each other is the lamp unit axis A2, and is a reference line on which the respective members (22 to 24) are installed. In the light source housing 25, a condenser lens groove for fitting the condenser lens 22, a shade groove for fitting the shade 23, and a projector lens groove for fitting the projector lens 24 are provided. In the light source housing 25, the lower member 25a is provided with a pair of fixing protrusions 25c arranged along the width direction, and the upper member 25b is provided with a pair of fixing pieces 25d arranged along the width direction (only those on the front side are illustrated in FIG. 3), so that each fixing protrusion 25c can be fit into a fixing hole 25e of the corresponding fixing piece 25d. The shape and other configurations of the light source housing 25 may be set as appropriate and are not limited to the configurations of the first embodiment.

The installation base portion 26 is site where the light source unit 21 is provided, and is formed of thermally conductive aluminum die-cast or resin, and functions as a heatsink that externally dissipates heat generated by the light source unit 21 as a whole. The installation base portion 26 has an installation site 26a and a heat radiation site 26b. The installation site 26a is a site where the light source unit 21 (and its base plate 32) is installed, and is a flat plate perpendicular to the axial direction. The light source housing 25 in which the lower member 25a and the upper member 25b are fitted to each other is attached to the installation site 26a via a pair of attachment pieces 27 disposed at positions at which the light source unit 21 is interposed therebetween in the width direction. The heat radiation site 26b has a plurality of heat radiating fins 26c provided continuously to the installation site 26a. The heat radiation site 26b externally radiates heat generated by the light source unit 21 installed in the installation site 26a mainly from each heat radiating fin 26c.

The light source unit 21 includes light sources 31 and the base plate 32 on which the light sources 31 are mounted. The light sources 31 include light emitting devices, such as light emitting diodes (LEDs), and emit light having an amber color (amber-colored light) with a Lambertian distribution centered on the emission light axis in the first embodiment. The light sources 31 are not limited to the configuration of the first embodiment, as the color (wavelength band), the mode of a distribution, and the number of colors can be set as needed.

Figure 5:
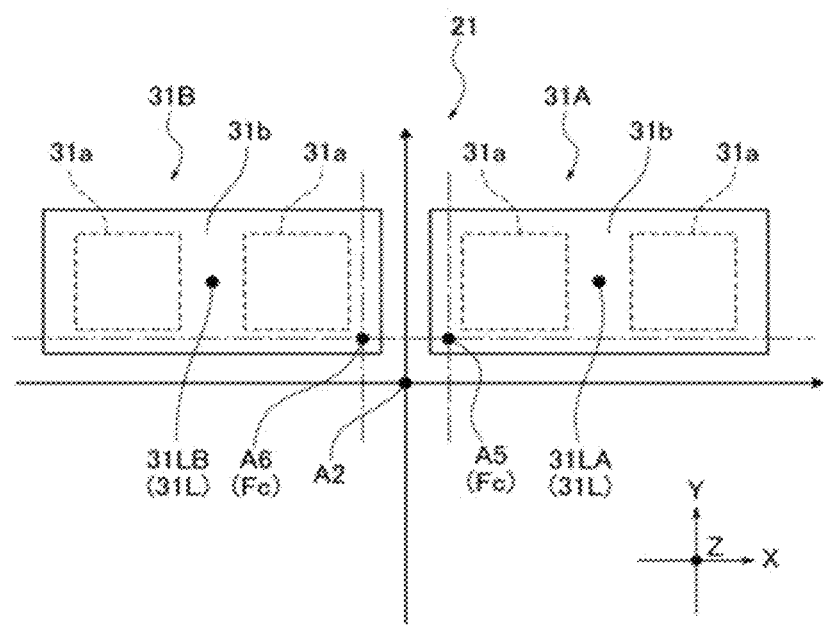
FIG. 5 is an explanatory diagram illustrating a configuration and positional relationship of light sources.

As illustrated in FIG. 5, the light sources 31 according to the first embodiment include a first light source 31A and a second light source 31B having the same configuration. Each of the light sources 31 includes two LED chips 31a arranged side by side in the width direction and fluorescent bodies 31b that cover the LED chips 31a. The light from each of the LED chips 31a is emitted as amber colored light by passing through each of the fluorescent bodies 31b. Therefore, in each of the light sources 31, the corresponding fluorescent body 31b functions as a light emitting surface. In each light source 31, the fluorescent body 31b has a rectangular shape that is long in the width direction, and an emission light axes 31L extend from the center of the fluorescent bodies 31b in the axial direction. Hereinafter, when the emission light axes 31L are individually described, the light axis of the first light source 31A is referred to as a first emission light axis 31LA, and the light axis of the second light source 31B is referred to as a second emission light axis 31LB.

The first light source 31A and the second light source 31B are arranged so that the fluorescent bodies 31b are positioned side by side on the base plate 32 with a space between each other in the width direction above a straight line extending in the width direction and including the lamp unit axis A2. In the first light source 31A, a later-described first condenser lens axis A5 of the condenser lens 22 is positioned on the fluorescent body 31b, and in the first embodiment, the first condenser lens axis A5 is positioned closer to the lamp unit axis A2 relative to the first emission light axis 31LA. Specifically, the first light source 31A is disposed such that the first emission light axis 31LA is positioned upward in the vertical direction and outward (away from the lamp unit axis A2) in the width direction relative to the first condenser lens axis A5. In the second light source 31B, a later-described second condenser lens axis A6 of the condenser lens 22 is positioned on the fluorescent body 31b, and in the first embodiment, the second condenser lens axis A6 is positioned closer to the lamp unit axis A2 relative to the second emission light axis 31LB. Specifically, the second light source 31B is disposed such that the second emission light axis 31LB is positioned upward in the vertical direction and outward (away from the lamp unit axis A2) in the width direction relative to the second condenser lens axis A6.

The base plate 32 is attached to the installation site 26a of the installation base portion 26, and the two light sources 31 are mounted in the above-described positional relationship. The base plate 32 is provided with a lighting control circuit, from which power is supplied as needed to turn on the light sources 31. By connecting the light source housing 25 to the installation site 26a as described above, the base plate 32 is positioned adjacent to the rear end portion (the end portion adjacent to the installation base portion 26 in the axial direction) of the light source housing 25 and faces the condenser lens 22 (the incident surface 33 thereof) accommodated in the light source housing 25 in the axial direction.

The condenser lens 22 collects the light emitted from the light source unit 21 and condenses the light on the shade 23. This condenser lens 22 has the incident surface 33 facing the light source unit 21 and an emission surface 34 directed to the opposite side. The condenser lens 22 of the first embodiment is optically set such that the incident surface 33 and the emission surface 34 are formed as free-form surfaces so as to form a desired light flux distribution on the shade 23 by the light emitted from the light source unit 21, that is, the first light source 31A and the second light source 31B. The optical settings of the condenser lens 22 will be described later.

The shade 23 is an example of a light shielding member that forms the irradiation pattern Pi by partially passing light from the light sources 31 that has been condensed by the condenser lens 22. As illustrated in FIG. 1, in the irradiation pattern Pi, three irradiation patterns Di aligned at equal intervals in the direction away from the vehicle 1. When each irradiation pattern Di is individually indicated herein, the one farthest from the vehicle 1 is defined as a first irradiation pattern Di1, and the others from the first irradiation pattern Di1 are defined as a second irradiation pattern Di2 and a third irradiation pattern Di3 in order as the pattern approaches the vehicle 1. Therefore, in the irradiation pattern Pi, the first irradiation pattern Di1 becomes a far irradiation pattern, the third irradiation pattern Di3 becomes a near irradiation pattern, and the second irradiation pattern Di2 between the first irradiation pattern Di1 and the third irradiation pattern Di3 becomes an intermediate irradiation pattern. In the first embodiment, each irradiation pattern Di is a large open V-shaped symbol, and the first irradiation pattern Di1 is slightly larger than the other two irradiation patterns Di2 and Li3.

The direction in which the vertexes of the V-shape of the irradiation patterns Di are aligned is defined as an arrow direction Da, and the side pointed by the irradiation patterns Di (first irradiation pattern Di1 side) is defined as the front side of the arrow direction Da. By aligning the three irradiation patterns Di, the irradiation pattern Pi can be made to look like an arrow pointing from the vehicle 1 in the arrow direction Da The irradiation pattern Pi is formed on the road surface 2, which is a projection plane, with the first irradiation pattern Di1, the second irradiation pattern Di2, and the third irradiation pattern Di3 are long in the direction orthogonal to the arrow direction Da.

Figure 6:
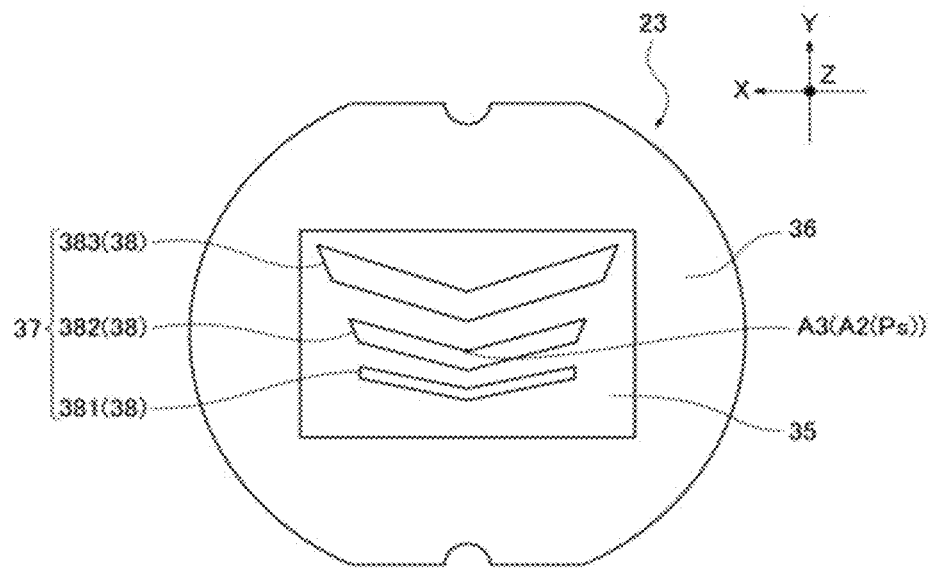
FIG. 6 is an explanatory diagram illustrating a shade as viewed from a condenser lens side.

As illustrated in FIG. 6, the shade 23 includes a shade portion 35 and a shade frame portion 36. The shade frame portion 36 is a substantially circular frame that surrounds the shade portion 35 and can be fitted into the shade groove of the light source housing 25, so that the shade frame portion 36 is attached to the light source housing 25. In the shade frame portion 36 of the first embodiment, an upper end and a lower end in the vertical direction are partially cut out in the width direction. In the shade 23, a shade reference point Ps (light shielding reference point) is set at the center position of the shade portion 35, and a line passing through the shade reference point Ps and orthogonal to the shade portion 35 is set as a shade reference axis line A3. By attaching the shade frame portion 36 of the shade 23 to the light source housing 25, the shade reference axis line A3 is aligned with the lamp unit axis A2, and the shade reference point Ps is positioned on the lamp unit axis A2.

The shade portion 35 is basically formed of a plate-like member that blocks transmission of light, and has an irradiation slit 37 through which the member is partially cutout and penetrated. The irradiation slit 37 corresponds to the irradiation pattern Pi, and shapes the irradiation pattern Pi into a predetermined shape by partially passing light from the light sources 31 that has been condensed by the condenser lens 22. The irradiation slit 37 is composed of the three slit sections 38 in the first embodiment.

These three slit sections 38 correspond to the three irradiation patterns Di on a one-to-one basis. Since the projector lens 24 inverts the light from the shade 23 (irradiation slit 37) and projects the inverted light onto the road surface 2, each of the slit sections 38 has such positional relationship as to be subject to rotation centered on the shade reference axis line A3 (lamp unit axis A2) with respect to the positional relationship of the respective irradiation patterns Di of the irradiation pattern Pi (see FIGS. 1 and 6, etc.). Therefore, in each slit section 38, a lowermost first slit 381 in the vertical direction is a far slit corresponding to the first irradiation pattern Di1 (far irradiation pattern) of the irradiation pattern Pi. In each slit section 38, a second slit 382 above the first slit 381 is an intermediate slit corresponding to the second irradiation pattern Di2 (intermediate irradiation pattern). In each slit section 38, an uppermost third slit 383 is a near slit corresponding to the third irradiation pattern Di3 (near irradiation pattern). In the shade 23 of the first embodiment, the third slit 383 is provided above the lamp unit axis A2 in the vertical direction, the second slit 382 is provided across a horizontal line including the lamp unit axis A2 below the third slit 383, and the first slit 381 is provided below the second slit 382. Light transmitted through the shade 23 (each slit section 38 of the irradiation slit 37) is projected onto the road surface 2 by the projector lens 24.

Each of the slit sections 38 is shaped to imitate a V-shaped symbol that largely opens like each corresponding irradiation pattern Di, and the top, bottom, left, and right are inversed with respect to the irradiation patterns Di. The position, shape, size, and intervals of the three slit sections 38 on the shade portion 35 are each set in accordance with the distance to the road surface 2 such that the irradiation patterns Di on the road surface 2 have the size and intervals illustrated in FIG. 1. Specifically, since the lamp unit 20 (vehicle lamp fitting 10) is provided at a position higher than the road surface 2 and forms the irradiation patterns Di arranged along the arrow direction Da on the road surface 2, the distances to the positions on the road surface 2 at which the corresponding irradiation patterns Di are formed is different for the respective slit sections 38. Therefore, the position, shape, size, and intervals of the respective slit sections 38 are set in accordance with the distances to the irradiation patterns Di formed by the light transmitted through the slit sections 38 and projected on the road surface 2 by the projector lens 24. Specifically, in the first embodiment, the first slit 381 is shaped to imitate a thin V-shaped symbol, the second slit 382 is shaped to imitate a V-shaped symbol thicker than the first slit 381, and the third slit 383 is shaped to imitate a V-shaped symbol thicker than the second slit 382. The slits are longer in the width direction than the corresponding irradiation patterns Di.

In this way, the three slit sections 38 have different sizes and different intervals from each other, unlike the irradiation patterns Di. In the slit sections 38, the first slit 381 has the smallest reduction ratio to the corresponding irradiation pattern Di, and when light that passes through the first slit is projected onto the road surface 2, the light is magnified at the greatest magnification rate to form the first irradiation pattern Di1. In the slit sections 38, the third slit 383 has the greatest reduction ratio to the corresponding irradiation pattern Di, and when light that passes through the third slit is projected onto the road surface 2, the light is magnified at the smallest magnification rate to form the third irradiation pattern Di3. In the shade 23, the shade reference point Ps (light shielding reference point) may be set at a substantially central position of the irradiation slit 37 (three slit sections 38), and is not limited to the configuration of the first embodiment.

As illustrated in FIG. 4, the projector lens 24 is basically a convex lens, and in the first embodiment, an incident surface 24a and an emission surface 24b are formed as free-form surfaces which are convex surfaces, and the lower side in the vertical direction is cut out. The projector lens 24 forms the irradiation pattern Pi (see FIG. 1) on the road surface 2 by projecting the irradiation slit 37 (each slit section 38 thereof) of the shade 23. The incident surface 24a and the emission surface 24b may be convex surface or concave surface, as long as the projector lens 24 is a convex lens, and are not limited to the configuration of the first embodiment.

A projection reference focal point Fb of the projector lens 24 is set on the lamp unit axis A2 and in the vicinity of the shade reference point Ps of the shade 23. The projection reference focal point Fb is a point where light is condensed when the light parallel to a projector lens axis A4 of the projector lens 24 is incident from the side of the emission surface 24b in a state in which the incident surface 24a and the emission surface 24b are set to be curved surfaces serving as a reference. In the projector lens 24, a central line in a state in which the incident surface 24a and the emission surface 24b are curved surfaces serving as a reference is the projector lens axis A4. Since the incident surface 24a and the emission surface 24b are free-form surfaces based on the curved surfaces serving as a reference, the light is not necessarily focused only on the projection reference focal point Fb. In the projector lens 24, an incident range Ri from the projection reference focal point Fb is 35 degrees or less around the projector lens axis A4. The size (angle) of the incident range Ri may be appropriately set, and is not limited to the configuration of the first embodiment.

The projector lens 24 is disposed in a state of being rotated (tilted) toward the lower side of the lamp unit axis A2 with a line extending in the width direction while passing through the projection reference focal point Fb as a rotation center, and in the first embodiment, the projector lens axis A4 is set at an angle of 20 degrees downward relative to the lamp unit axis A2. The projector lens 24 is not limited to the configuration of the first embodiment as long as the projector lens 24 is disposed in a state of being rotated toward the lower side of the lamp unit axis A2 with the projection reference focal point Fb set at the above-described position. The angle of the projector lens axis A4 relative to the lamp unit axis A2 is preferably in the range of 15 to 20 degrees.

Since the projection reference focal point Fb is positioned on the lamp unit axis A2 and in the vicinity of the shade reference point Ps of the shade 23 as described above, the projector lens 24 can form the image of the irradiation slit 37 (each slit section 38) of the shade portion 35 on the projector lens axis A4 in a state with the least aberration according to its own optical setting. Therefore, the projector lens 24 can project the light passing through the irradiation slit 37 (each slit section 38) of the shade 23 having a light flux distribution described later on the periphery of a position intersecting the projector lens axis A4 on the road surface 2.

In the projector lens 24, a lower end in the vertical direction is cut out to form a lower end surface 24c, and a side surface adjacent to the lower end surface 24c is cut out to form a curved surface 24d. The lower end surface 24c and the curved surface 24d are formed by partially cutting out portions interfering with the light source housing 25 (lower member 25a) in the projector lens 24; the lower end surface 24c is a flat surface at a position substantially the same as that of the lower end of the shade 23 in the vertical direction: and the curved surface 24d is a curved surface along the inner side surface of the light source housing 25 (lower member 25a). In this way, the projector lens 24 can be accommodated inside the light source housing 25. This is because the projector lens 24 is provided at a position rotated toward the side lower than the lamp unit axis A2 as described above, and thus interferes with the cylindrical light source housing 25 when the lower end surface 24c and the curved surface 24d are not provided. When the projector lens 24 is fitted into the condenser lens groove of the light source housing 25, the projector lens 24 is attached to the light source housing 25 in a state in which the projector lens axis A4 tilts downward relative to the lamp unit axis A2 as described above, and has the above-described positional relationship with respect to the shade 23 fitted into the shade groove of the light source housing 25.

The optical settings of the condenser lens 22 will now be described with reference to FIGS. 7 to 15. FIG. 11 to FIG. 15 illustrates the region irradiated by changing the color in accordance with the difference in the density of the light flux, and the region is represented by contour lines in which the brightness increases toward the center of the region.

As illustrated in FIG. 4, the condenser lens 22 has a central section recessed inward (side opposite to the light source unit 21) of the condenser lens 22, a curved incident surface section 41 convexed outward at the center of the incident surface 33, and an annular incident surface section 42 surrounding the curved incident surface section 41. Around the incident surface 33, a conical reflective surface 43 that surrounds the annular incident surface section 42 is provided.

The curved incident surface section 41 faces the light source unit 21 in the axial direction, that is, the direction in which a condenser lens axes extend (condenser lens axial direction), and the light source unit 21 is positioned in the vicinity of a condensing reference focal point Fc on the condenser lens axes (first condenser lens axis A5 and second condenser lens axis A6 to be described later) (see FIGS. 5, 9, 10, etc.). In a state in which the curved incident surface section 41 is set to be a curved surface serving as a reference, the condensing reference focal point Fc is the site where light is condensed when light parallel to the condenser lens axes passes through the curved incident surface section 41 from the emission surface 34 side. Here, the curved incident surface section 41 is a free-form surface based on a curved surface serving as a reference, and even when the above-described parallel light is incident from the emission surface 34 side, all the light fluxes do not necessarily pass through the condensing reference focal point Fc.

The curved incident surface section 41 causes the light emitted from the light source unit 21 to be incident on the condenser lens 22 as light traveling forward in the axial direction. The annular incident surface section 42 protrudes toward the light source unit 21 and causes light from the light source unit 21 that does not travel to the curved incident surface section 41 to enter the condenser lens 22. The reflective surface 43 is formed at a position in the traveling direction of the light that enters the condenser lens 22 from the annular incident surface section 42. The reflective surface 43 reflects the light incident from the annular incident surface section 42 so that the light travels forward in the axial direction. The reflective surface 43 may reflect light by total reflection and may be formed by bonding aluminum or silver to its surface through vapor deposition or painting. Therefore, at the incident surface 33 of the condenser lens 22, light that passes through the curved incident surface section 41 becomes direct light directed toward the emission surface 34, while light that has passed through the annular incident surface section 42 and is reflected by the reflective surface 43 becomes reflected light toward the emission surface 34 after being reflected inside the condenser lens 22.

The emission surface 34 emits, to the front side in the axial direction, light incident from the incident surface 33. The emission surface 34 condenses the light incident from the incident surface 33 and causes the light to travel to a region in which the irradiation slit 37 (each slit section 38) is provided in the shade portion 35 of the shade 23.

On a transverse section including the axial direction and the width direction, the condenser lens 22 condenses light from the light source unit 21 so that a light flux passing through the vicinity of the lamp unit axis A2 approaches the lamp unit axis A2 between the emission surface 34 and the shade 23, the light flux passing through a position away from the lamp unit axis A2 is collimated. That is, in the transverse section of the condenser lens 22, the concentration of the light flux on the lamp unit axis A2 is the highest, and the concentration of the light flux gradually decreases as the distance from the lamp unit axis A2 increases.

The condenser lens 22 collects the light from the light source unit 21 so as to condenses the light on the irradiation slit 37 (each slit section 38) in the longitudinal section including the axial direction and the vertical direction. The condenser lens 22 tilts optical paths leading to the shade 23, that is, optical paths from a condensing reference focal point Fc through which light passes from the emission surface 34 to the shade 23 (a mode of light fluxes of light emitted from the light source unit 21 passing through the condensing reference focal point Fc and condensed on the shade 23 from the emission surface 34): the condenser lens 22 tilts the optical paths below its condenser lens axes (first condenser lens axis A5 and second condenser lens axis A6 to be described later) so that the light traveling farther forward in the axial direction moves away and downward.

Specifically, as illustrated in FIG. 9, the condenser lens 22 condenses the light flux incident from the curved incident surface section 41 among the light passing through the condensing reference focal point Fc on the shade 23 at a position below the condenser lens axes (first condenser lens axis A5 and second condenser lens axis A6 to be described later). Here, in the condenser lens 22, the light flux passing through the curved incident surface section 41 is mainly directed to an inner emission surface section 53 (to be described later) of the emission surface 34. Therefore, the optical paths from the condensing reference focal point Fc illustrated in FIG. 9 tilt downward by mainly setting the curvatures of the curved incident surface section 41 and the inner emission surface section 53 of the condenser lens 22.

As illustrated in FIG. 10, the condenser lens 22 condenses the light flux incident from the annular incident surface section 42 and then reflected by the reflective surface 43, among the light passing through the condensing reference focal point Fc, on the shade 23 at a position lower than the condenser lens axes (A5, A6). Here, in the condenser lens 22, the light flux reflected by the reflective surface 43 via the annular incident surface section 42 is mainly directed to an outer emission surface section 54 (described later) of the emission surface 34. Therefore, the optical paths from the condensing reference focal point Fc illustrated in FIG. 10 tilt downward by mainly setting the curvatures of the reflective surface 43 and the outer emission surface section 54 of the condenser lens 22.

In this way, the optical paths from the condensing reference focal point Fc tilt downward by setting the curvatures of the incident surface 33 and the emission surface 34 of the condenser lens 22. In particular, since the condenser lens axes (A5, A6) are located below the emission light axes 31L of the light sources 31 of the light source unit 21 in the vertical direction (see FIGS. 4 and 5), the condenser lens 22 according to the first embodiment can assist the tilting of the optical paths (light fluxes), which are emitted from the light source unit 21 positioned in the vicinity of the condensing reference focal point Fc, below the condenser lens axes. This is because the light emitting surfaces (fluorescent bodies 31b) of the light sources 31 of the light source unit 21 have predetermined areas, and thus the condenser lens 22 can displace (adjust) the irradiation region on the shade 23 in the vertical direction while effectively using the light from the light sources 31 by changing (adjusting) the positions of the condenser lens axes in the vertical direction relative to the emission light axes 31L.

Figure 7:
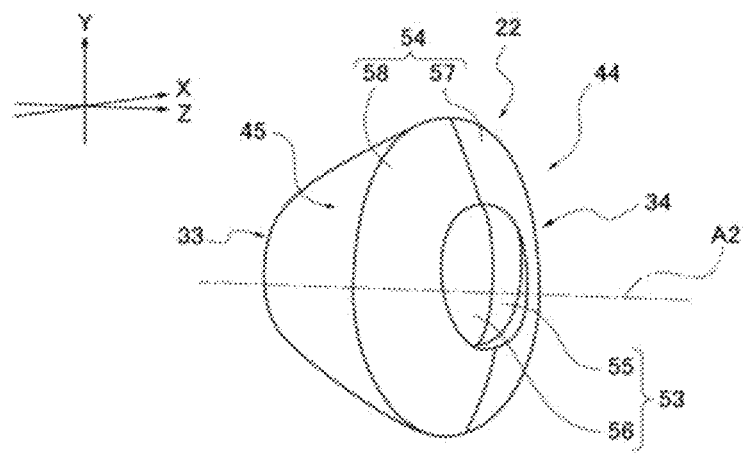
FIG. 7 is a perspective view of a condenser lens from an emission surface side.
Figure 8:
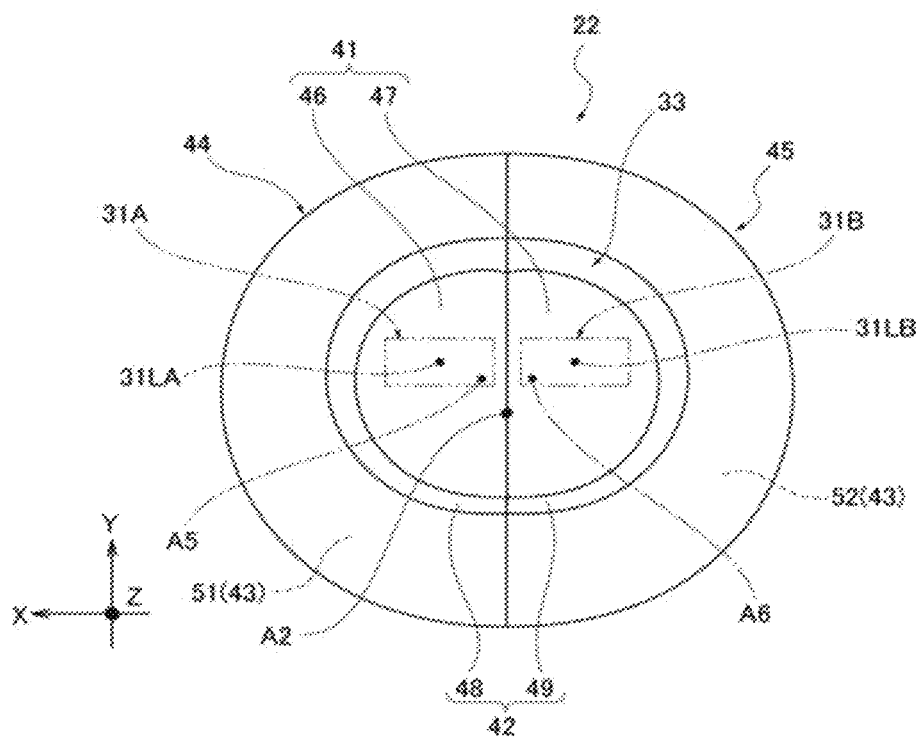
FIG. 8 is an explanatory diagram illustrating a condenser lens as viewed from a light source unit side.

As illustrated in FIGS. 7 and 8, the condenser lens 22 is symmetrical with respect to a plane including the lamp unit axis A2 and orthogonal to the width direction, and one side in the width direction is a first lens portion 44 and the other side in the width direction is a second lens portion 45. For this reason, in the first embodiment, in a state in which the condenser lens 22 and the shade 23 are viewed from the light source unit 21 side (states of FIGS. 6 and 8), the left side in the width direction is the one side, and the right side in the width direction is the other side. The one side and the other side may be appropriately set, and are not limited to the configuration of the first embodiment. Accordingly, the curved incident surface section 41 includes a first curved incident surface portion 46 provided in the first lens portion 44 and a second curved incident surface portion 47 provided in the second lens portion 45. The annular incident surface section 42 includes a first annular incident surface portion 48 provided in the first lens portion 44 and a second annular incident surface portion 49 provided in the second lens portion 45. The reflective surface 43 includes a first reflective surface 51 provided in the first lens portion 44 and a second reflective surface 52 provided in the second lens portion 45.

As illustrates in FIG. 8, the first curved incident surface portion 46, the first annular incident surface portion 48, and the first reflective surface 51 are formed in an annular shape about an axial line positioned on the upper side in the vertical direction and on one side (left side) in the width direction relative to the lamp unit axis A2, and the axial line is defined as the first condenser lens axis A5 of the first lens portion 44. The second curved incident surface portion 47, the second annular incident surface portion 49, and the second reflective surface 52 are formed in an annular shape about an axial line positioned on the upper side in the vertical direction and on one side (right side) in the width direction relative to the lamp unit axis A2, and the axial line is defined as the second condenser lens axis A6 of the second lens portion 45. In the condenser lens 22, the first condenser lens axis A5 and the second condenser lens axis A6 are arranged in the width direction on the upper side in the vertical direction relative to the lamp unit axis A2. The first lens portion 44 is positioned relative to the first light source 31A so that the first condenser lens axis A5 is positioned on the fluorescent body 31b of the first light source 31A and on the lower side in the vertical direction and the inner side in the width direction (the side in the direction approaching the lamp unit axis A2) relative to the first emission light axis 31LA. The second condenser lens axis A6 of the second lens portion 45 is positioned relative to the second light source 31B such that the second condenser lens axis A6 is positioned on the fluorescent body 31b of the second light source 31B and on the lower side in the vertical direction and the inner side in the width direction (the side in the direction approaching the lamp unit axis A2) relative to the second emission light axis 31LB.

As illustrated in FIG. 7, the condenser lens 22 includes, as the emission surface 34, an inner emission surface section 53 and an outer emission surface section 54 having different optical settings. The inner emission surface section 53 is provided near the center of the emission surface 34 in a region where the light traveling through the curved incident surface section 41 is incident. The inner emission surface section 53 is recessed inward (toward the incident surface 33 (rear side in the axial direction)) in the condenser lens 22 relative to the outer emission surface section 54. The inner emission surface section 53 of the first embodiment includes a first inner emission surface portion 55 provided in the first lens portion 44 so as to face the first curved incident surface portion 46 in the axial direction, and a second inner emission surface portion 56 provided in the second lens portion 45 so as to face the second curved incident surface portion 47 in the axial direction. The first inner emission surface portion 55 and the second inner emission surface portion 56 are formed as an integral free-form surface and constitute the inner emission surface section 53. The inner emission surface section 53 causes the light passing through the first curved incident surface portion 46 and the second curved incident surface portion 47 to travel toward the front side in the axial direction while refracting the light, and forms a plurality of light distribution images of the light source unit 21, that is, the two light sources 31 at positions corresponding to the optical characteristics on the shade 23 (each slit section 38 of the shade portion 35). This optical characteristic can be set by adjusting the curvature (surface shape) of the inner emission surface section 53 along with the curved incident surface section 41 at each location, and in the first embodiment, the curvature is set by gradually changing the curvature.

Figure 11:
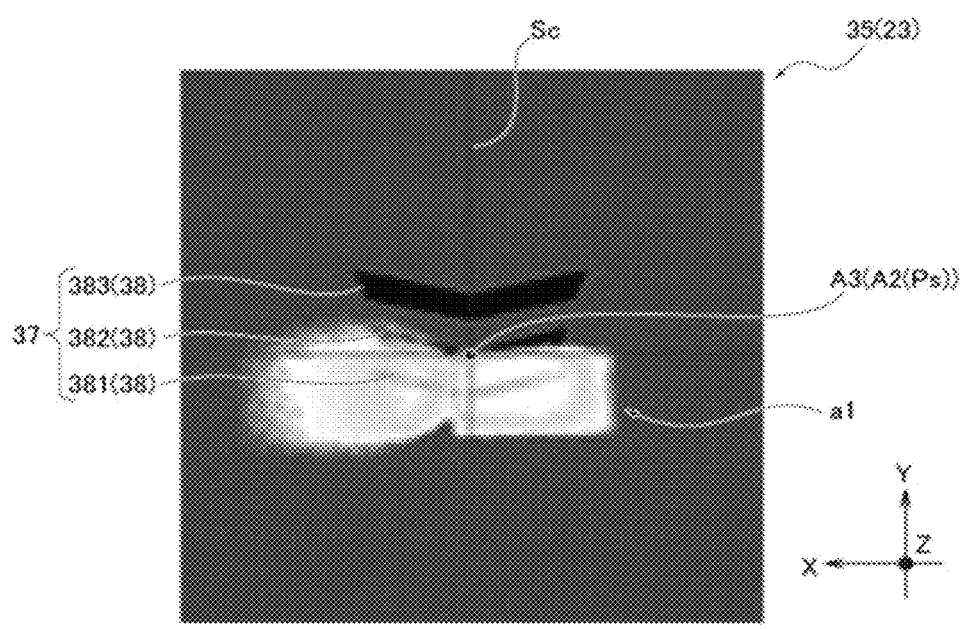
FIG. 11 is an explanatory diagram illustrating a light flux distribution in a first region formed on a shade by light from two light sources that is incident on a condenser lens from a first curved incident surface portion to be emitted from an inner emission surface section.

The inner emission surface section 53 appropriately refracts the light that has been emitted from the two light sources 31 and has passed through the first curved incident surface portion 46, so that the light is radiated on the shade 23, and a first region a1 illustrated in FIG. 11 is formed. The first region a1 radiates the entire region of the first slit 381 and increases the light flux density over the entire region of the right side of the first slit 381 in FIG. 11, that is, half of the region on the other side in the width direction. Here, since the first curved incident surface portion 46 is provided on the one side in the width direction, the light passing through the first curved incident surface portion 46 increases the light flux density of half of the region on the side opposite to the side on which the first curved incident surface portion 46 is provided in the width direction. In the first region a1 of the first embodiment, a region having high light flux density extends to a part on one side in the width direction beyond a shade center line Sc including the lamp unit axis A2 and extending in the vertical direction, and the periphery of the shade center line Sc in the first slit 381 also has high light flux density.

Figure 12:
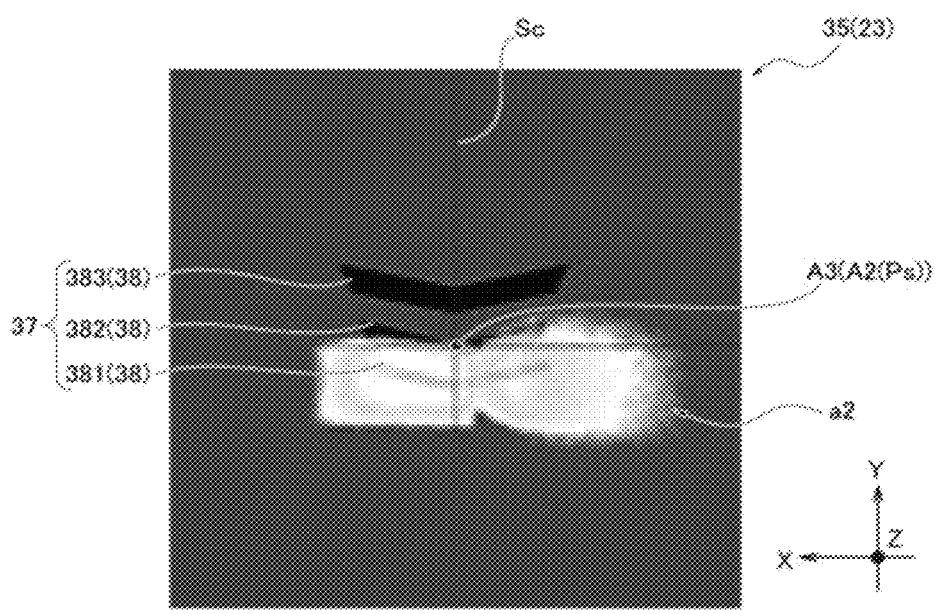
FIG. 12 is an explanatory diagram illustrating a light flux distribution in a second region formed on a shade by light from two light sources that is incident on a condenser lens from a second curved incident surface portion to be emitted from an inner emission surface section.

The inner emission surface section 53 appropriately refracts the light that has been emitted from the two light sources 31 and has passed through the second curved incident surface portion 47, so that the light is radiated on the shade 23, and a second region a2 illustrated in FIG. 12 is formed. The second region a2 radiates the entire region of the first slit 381 and increases the light flux density over the entire region of the left side of the first slit 381 in FIG. 12, that is, half of the region on the one side in the width direction. Here, since the second curved incident surface portion 47 is provided on the other side in the width direction, the light passing through the second curved incident surface portion 47 increases the light flux density of half of the region on the side opposite to the side on which the second curved incident surface portion 47 is provided in the width direction. In the second region a2 of the first embodiment, a region having high light flux density extends to a part on the other side in the width direction beyond the shade center line Sc, and the periphery of the shade center line Sc in the first slit 381 also has high light flux density.

The outer emission surface section 54 is provided in a region surrounding the inner emission surface section 53 as illustrated in FIG. 7, and is positioned in the region where the light that passes from the two light sources 31 via the annular incident surface section 42 and is reflected by the reflective surface 43 travels. The outer emission surface section 54 is positioned on (protrudes to) the outer side (front side in the axial direction) in the condenser lens 22 relative to the inner emission surface section 53. The outer emission surface section 54 of the first embodiment includes a first outer emission surface portion 57 provided in the first lens portion 44 so as to face the first reflective surface 51 in the axial direction, and a second outer emission surface portion 58 provided in the second lens portion 45 so as to face the second reflective surface 52 in the axial direction. The first outer emission surface portion 57 mainly emits light that is incident on the condenser lens 22 from the first annular incident surface portion 48 and is reflected by the first reflective surface 51, among light from the light source unit 21 (two light sources 31). The second outer emission surface portion 58 mainly emits light that is incident on the condenser lens 22 from the second annular incident surface portion 49 and is reflected by the second reflective surface 52, among light from the light source unit 21 (two light sources 31).

The first outer emission surface portion 57 and the second outer emission surface portion 58 are formed as an integral free-form surface and constitute the outer emission surface section 54. The outer emission surface section 54 causes the light reflected by the first reflective surface 51 and the second reflective surface 52 to travel toward the front side in the axial direction while refracting the light, and forms a plurality of light distribution images of the light source unit 21, that is, the two light sources 31 at positions corresponding to the optical characteristics on the shade 23 (each slit section 38 of the shade portion 35). This optical characteristic can be set by adjusting the curvature (surface shape) of the outer emission surface section 54 along with the reflective surface 43 at each location, and in the first embodiment, the curvature is set by gradually changing the curvature.

Figure 13:
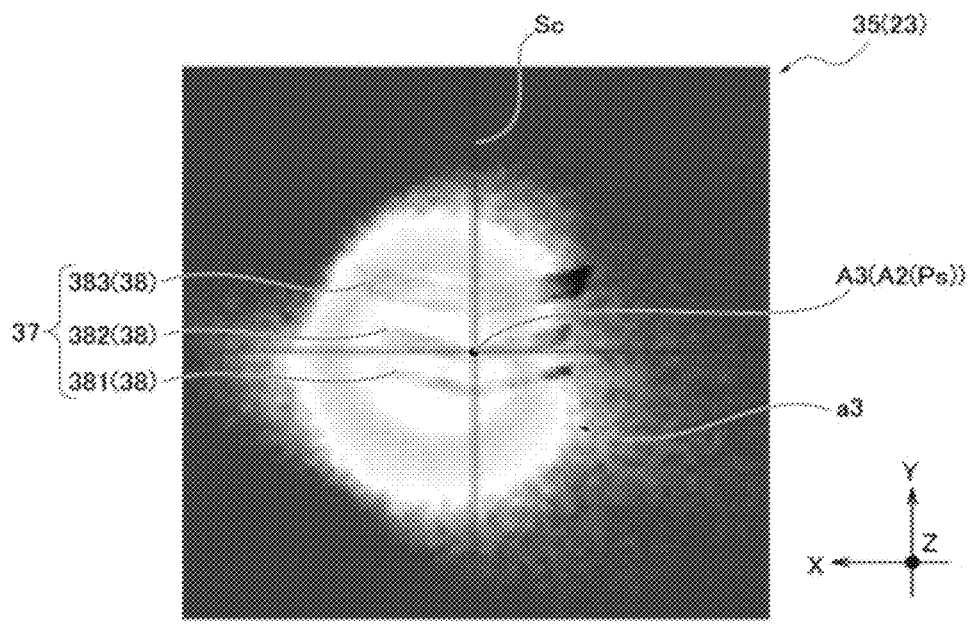
FIG. 13 is an explanatory diagram illustrating a light flux distribution in a third region formed on a shade by light from two light sources that is incident on a condenser lens from a first annular incident surface portion, reflected by a first reflective surface, and then emitted from a first outer emission surface portion.

This first outer emission surface portion 57 appropriately refracts the light that is emitted from the two light sources 31 through the first annular incident surface portion 48 and is reflected by the first reflective surface 51, so that the light is radiated on the shade 23, and a third region a3 illustrated in FIG. 13 is formed. The third region a3 radiates the entire region of the left side of the three slit sections 38 in FIG. 13, that is, half of the region on the one side in the width direction. Here, since the first outer emission surface portion 57 and the first annular incident surface portion 48 are provided on the one side in the width direction, the light that has passed through the first outer emission surface portion 57 and the first annular incident surface portion 48 is radiated on half of each slit section 38 on the side on which the slit section 38 is provided in the width direction. The third region a3 of the first embodiment extends to a part on the other side in the width direction beyond the shade center line Sc, and the periphery of the shade center line Sc in the three slit sections 38 is also irradiated.

Figure 14:
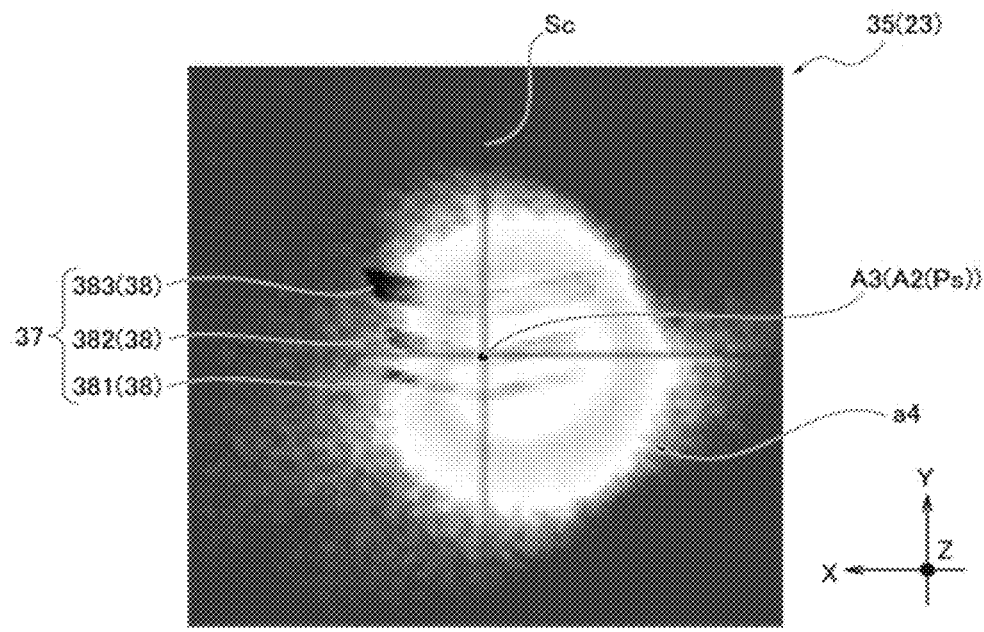
FIG. 14 is an explanatory diagram illustrating a light flux distribution in a fourth region formed on a shade by light from two light sources that is incident on a condenser lens from a second annular incident surface portion, reflected by a second reflective surface, and then emitted from a second outer emission surface portion.

The second outer emission surface portion 58 appropriately refracts the light that is emitted from the two light sources 31 through the second annular incident surface portion 49 and reflected by the second reflective surface 52, so that the shade 23 is irradiated with the light, to form a fourth region a4 illustrated in FIG. 14. The fourth region a4 radiates the entire region of the right side of the three slit sections 38 in FIG. 14, that is, half of the region on the other side in the width direction. Here, since the second outer emission surface portion 58, the second annular incident surface portion 49, and the second reflective surface 52 are provided on the other side in the width direction, the light that has passed through these on the side on which the slit section 38 is provided in the width direction. The fourth region a4 of the first embodiment extends to a part on the one side in the width direction beyond the shade center line Sc, and the periphery of the shade center line Sc in the three slit sections 38 is also irradiated.

Figure 15:
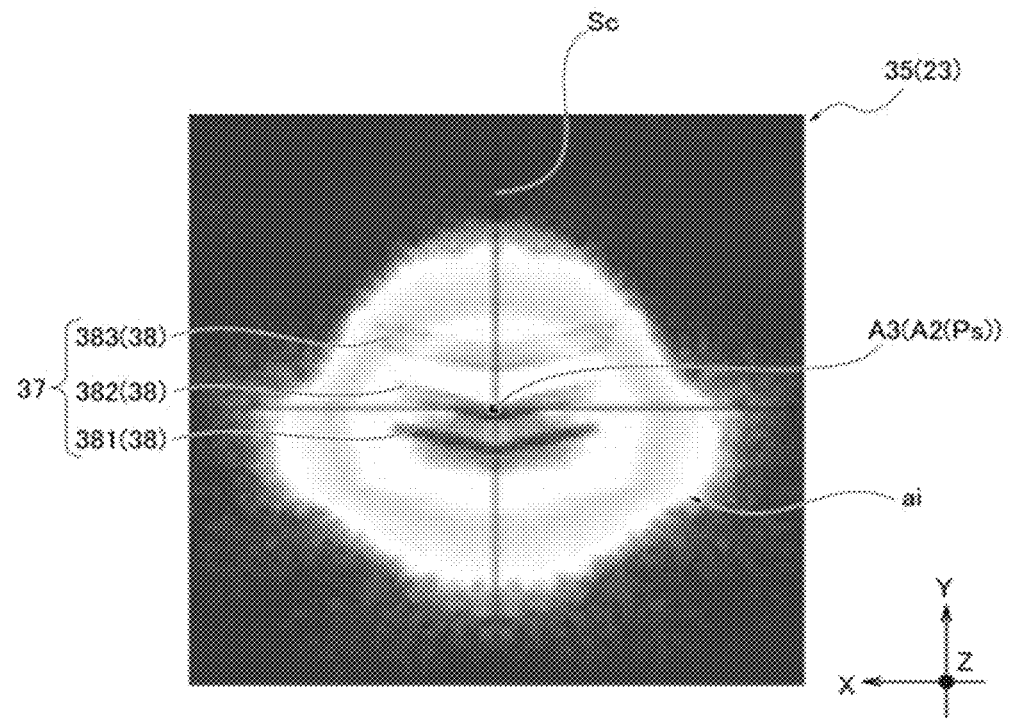
FIG. 15 is an explanatory diagram illustrating a light flux distribution when four regions are overlapped on a shade.
Figure 16:
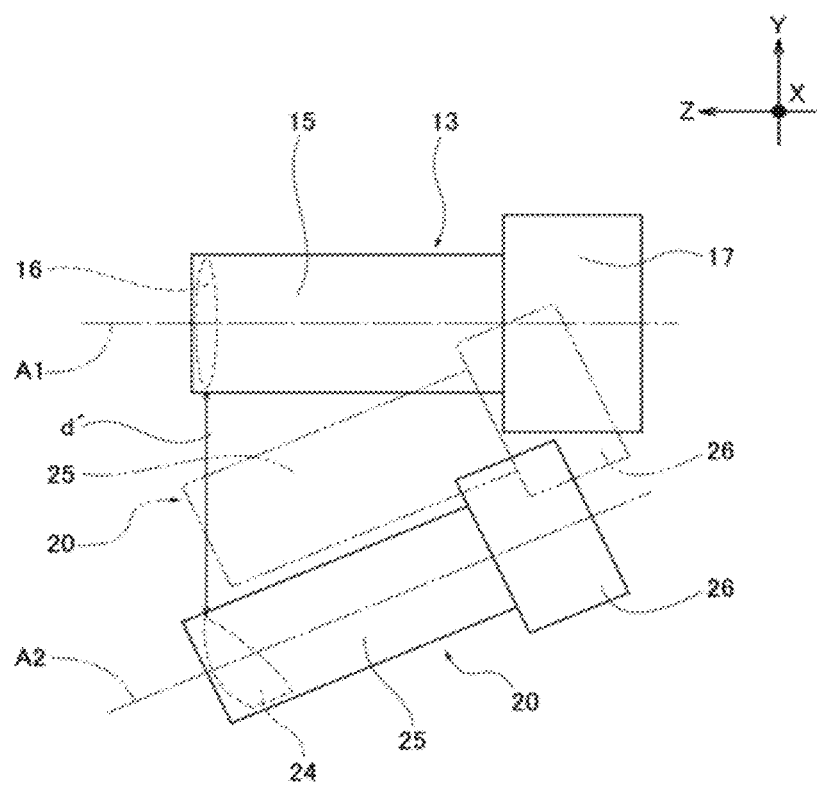
FIG. 16 is an explanatory diagram for illustrating a problem when tilting a lamp unit is provided side by side with a signal lamp unit.

Accordingly, the condenser lens 22 can form an irradiation region a1 on the shade 23 illustrated in FIG. 15 by the light emitted from the two light sources 31 of the light source unit 21. The irradiation region a1 is obtained by overlapping the above-described four regions (from a1 to a4), and the three slits 381, 382, and 383 are made bright as a whole such that the light flux density near the vertex of the first slit 381 is made highest and the light flux density is made gradually lower as the distance from the vertex increases. Specifically, the irradiation region a1 has high light flux density from the vicinity of the vertex of the first slit 381 to the vicinities of both ends in the width direction, and has high light flux density from the vicinity of the vertex of the second slit 382 to an intermediate position in the width direction. In this way, the condenser lens 22 can form a desired light flux distribution on the shade 23, the brightness of each irradiation pattern Di obtained when each irradiation pattern Di is projected onto the road surface 2 can be set to a desired brightness, and an intended irradiation pattern Pi can be formed. In the irradiation pattern Pi of the first embodiment, the state of pointing in the arrow direction Da is emphasized by making each irradiation pattern Di bright as a whole while making the vicinity of the vertex of the first irradiation pattern Di1 brightest.

The condenser lens 22 of the first embodiment extends the regions having high light flux density of the first region a1 and the second region a2 to the opposite side beyond the shade center line Sc, and the third region a3 and the fourth region a4 each extend to the opposite side beyond the shade center line Sc. Therefore, the condenser lens 22 can superimpose the four regions (a1 to a4) formed without gaps, and the light flux density on the shade center line Sc can be increased. In particular, since the condenser lens 22 of the first embodiment has the condenser lens axes (A5, A6) positioned inward of the emission light axes 31L of the light sources 31 of the light source unit 21 in the width direction, it is possible to assist the four regions (a1 to a4) to appropriately overlap each other on the shade center line Sc. This is because the condenser lens 22 can adjust the position of the irradiation region on the shade 23 in the width direction by adjusting the positions of the condenser lens axes in the width direction relative to the emission light axes 31L, and can expand the irradiation region to the opposite side beyond the shade center line Sc by positioning the condenser lens axes (A5, A6) on the inner side in the width direction. This adjustment is particularly effective for setting the positions of the regions having high light flux density in the width direction in the first region a1 and the second region a2.

In the condenser lens 22, flange portions provided at both ends in the width direction can be fitted into the condenser lens groove in the light source housing 25. When the flange portions are fitted into the condenser lens groove, the positional relationship of the condenser lens 22 relative to the light source unit 21 is set such that the first condenser lens axis A5 and the second condenser lens axis A6 have the above-described positional relationship relative to the emission light axes 31L. The condenser lens 22 is disposed such that the first light source 31A and the second light source 31B are positioned inside the annular incident surface section 42 so as to face the curved incident surface section 41 in the axial direction, and the first light source 31A and the second light source 31B are positioned slightly above the condenser lens axes (A5, A6).

This lamp unit 20 is assembled as follows. First, the two light sources 31 are mounted on the base plate 32, the light source unit 21 is assembled, and the light source unit 21 is fixed at the installation site 26a on the installation base portion 26. After that, in the lower member 25a of the light source housing 25, the condenser lens 22 is fitted into the condenser lens groove, the shade 23 is fitted into the shade groove, and the projector lens 24 is fitted into the projector lens groove. The lower member 25a is then fitted to the upper member 25b to form the light source housing 25, and the light source housing 25 is attached to the installation base portion 26 via the two attachment pieces 27. This causes the condenser lens 22, the shade 23, and the projector lens 24 to be housed in the light source housing 25, and the light source unit 21 is provided so as to face the condenser lens 22. Consequently, the condenser lens 22, the shade 23, and the projector lens 24 are arranged in order from the light source unit 21 side along the lamp unit axis A2, and the lamp unit 20 is assembled with the projector lens 24 in such an orientation that the projector lens axis A4 tilts downward relative to the lamp unit axis A2. In the lamp unit 20, the light source unit 21 (first emission light axis 31LA and second emission light axis 31LB) and the condenser lens 22 (first condenser lens axis A5 and second condenser lens axis A6) are positioned on the upper side in the vertical direction (perpendicular direction) relative to the lamp unit axis A2 (see FIG. 4 and the like).

As illustrated in FIG. 2, the lamp unit 20 is disposed adjacent to the lower side of the signal lamp unit 13 in the lamp chamber 14, while the lamp unit axis A2 is parallel to the signal lamp unit axis A1 of the signal lamp unit 13, and the lamp unit 20 is fixed to the lamp housing 11. In this way, the vehicle lamp fitting 10 is assembled. In the vehicle lamp fitting 10, the signal lamp unit axis A1 and the lamp unit axis A2 are parallel to the road surface 2, and the projector lens 24 is disposed in the lamp unit 20 so as to have such an orientation that the projector lens axis A4 tilts downward relative to the lamp unit axis A2.

The action of the vehicle lamp fitting 10 will now be described. In the vehicle lamp fitting 10, the signal lamp unit 13 can be turned on and off as appropriate by supplying power from the lighting control circuit to the light sources. In the vehicle lamp fitting 10, the lamp unit 20 can be turned on and off as appropriate by supplying power from the lighting control circuit from the base plate 32 to the two light sources 31. The vehicle lamp fitting 10 then links the signal lamp unit 13 and the lamp unit 20, and when the signal lamp unit 13 is flashing, the two light sources 31 are turned on in time with the flashing. Then, in the lamp unit 20, the light from the two light sources 31 is condensed by the condenser lens 22, the shade 23 is irradiated by the light, and the light passes through the irradiation slit 37 (each slit section 38), and is then projected by the projector lens 24, so that the irradiation pattern Pi is formed on the road surface 2. Consequently, in the lamp unit 20, the projector lens 24 (its light emission surface 24b) functions as a light emitting part that emits light when viewed from the surroundings. In the irradiation pattern Pi, the light with the light flux distribution described above passes through the irradiation slit 37 (each slit section 38) of the shade 23, and is thereafter projected by the projector lens 24, so that the three irradiation patterns Di are arranged in the arrow direction Da.

Therefore, the vehicle lamp fitting 10 can cause the vehicle 1 to present, to a person in the surrounds, a flashing state of the signal-lamp light-emitting portion 16 of signal lamp unit 13 and a flashing state of the three irradiation patterns Di in the vicinity arranged in the arrow direction Da on the road surface 2, so that it is possible to enhance the visibility of the turn lamp. This is especially effective because the irradiation pattern Pi on the road surface 2 can be seen even by a person who is at a position where it is difficult to see the signal-lamp light-emitting portion 16 directly, such as a person who is in a different alley from the vehicle 1 at an intersection with poor visibility, or a person who attempts to overtake the vehicle 1 from behind. In addition, when the hazard lamps of the vehicle 1 are turned on, the left and right vehicle lamp fittings 10 are turned on at the same time, that is, the signal-lamp light-emitting portions 16 of the left and right signal lamp units 13 are turned on, and the two lamp units 20 form the two irradiation patterns Pi on the road surface 2 such that the irradiation patterns Pi spread to the left and right. Therefore, the vehicle 1 can cause a person to more certainly recognize that the hazard lamps are turned on compared to when only the signal lamp units 13, which serve as the left and right turn lamps, are flashing.

The action of the lamp unit 20 will now be described. The lamp unit 20 is provided with the single condenser lens 22 that guides the light from the two light sources (31A, 31B) into the incident surface 33 and out from the emission surface 34. In the lamp unit 20, the light emitted from each of the light sources 31 in the direction substantially along each emission light axis 31L enters from the curved incident surface section 41 of the incident surface 33 in the condenser lens 22, and the light emitted from the light sources 31 at a direction in which the light spreads (at large angle to each emission light axis 31L) enters from the annular incident surface section 42 of the incident surface 33 and is reflected by the reflective surface 43. Therefore, the lamp unit 20 can efficiently use the light emitted from the two light source 31 even when a single condenser lens 22 is used for the two light sources 31.

In the condenser lens 22 of the lamp unit 20, the light incident from the curved incident surface section 41 and the light incident from the annular incident surface section 42 and reflected by the reflective surface 43 form different regions (a1 to a4), and the irradiation region a1 is formed by combining the different regions. Therefore, the lamp unit 20 can form different areas (a1 to a4) by using the difference between the two optical paths (four optical paths in total)

even with the single condenser lens 22, and can form the irradiation region a1 having a desired light flux distribution. Therefore, the lamp unit 20 can easily adjust the light flux distribution on the shade 23, and the irradiation pattern Pi to be formed can be made to have a desired brightness distribution.

Furthermore, in the lamp unit 20, the light source unit 21 and the condenser lens 22 are disposed so as to be positioned above the lamp unit axis A2, that is, the shade reference axis line A3 of the shade 23, and the traveling direction of the light from the light source unit 21 toward the irradiation slit 37 (each slit section 38) of the shade 23 from the condenser lens 22 can be directed downward. Therefore, the lamp unit 20 can assist the optical setting in the condenser lens 22 (optical path from the condensing reference focal point Fc tilts to the lower side of the condenser lens axis) by the positional relationship of the light source unit 21 and the condenser lens 22 relative to the shade 23. Consequently, in the lamp unit 20, it is possible to reduce the amount of adjustment of the curvature of the incident surface 33 and the emission surface 34 for the optical setting in the condenser lens 22, and the optical path from the condenser lens 22 to the shade 23 can be appropriately set with a simpler configuration. Therefore, the lamp unit 20 can form a desired light flux distribution on the shade 23, a desired brightness distribution in the irradiation pattern Pi can be obtained, and the irradiation pattern Pi can be appropriately formed on the road surface 2 even when the lamp unit axis A2 is parallel to the road surface 2.

In addition, the lamp unit 20 has such an orientation that the projector lens axis A4 tilts downward relative to the lamp unit axis A2 by positioning the projection reference focal point Fb of the projector lens 24 on the lamp unit axis A2 and near the shade reference point Ps of the shade 23, and rotating the projector lens 24 about the projection reference focal point Fb. Therefore, in the lamp unit 20, the projector lens 24 can project an image of each slit section 38 brightened by the light from the light sources 31 in the shade 23 (shade portion 35), onto the projector lens axis A4. At this time, the lamp unit 20 has the projection reference focal point Fb positioned near the shade reference point Ps of the shade 23. Therefore, the projector lens 24 can project an image of the vicinity of the shade reference point Ps, that is, each slit section 38 brightened in a state with the least aberration according to the optical setting, onto the projector lens axis A4. Consequently, even when the lamp unit axis A2 is parallel to the road surface 2, the lamp unit 20 can appropriately form the irradiation pattern Pi on the road surface 2 from a position higher than the road surface 2.

In the lamp unit 20, the projector lens 24 is provided such that the projector lens axis A4 tilts downward relative to the lamp unit axis A2 so that the lamp unit axis A2 is positioned within the incident range Ri from the projection reference focal point Fb. Therefore, in the lamp unit 20, the direction along the lamp unit axis A2 of the light that passes through each slit section 38 is the brightest, but the projector lens 24 can efficiently condense such light according to the optical setting and can appropriately project, on the projector lens axis A4, an image of each brightened slit section 38. In the lamp unit 20, the condenser lens 22 and the light source unit 21 are provided such that the emission light axes 31L of the light sources 31 are positioned above the condenser lens axes (A5, A6) of the condenser lens 22. Therefore, in the lamp unit 20, the traveling direction of the light from the light sources 31 traveling from the light source unit 21 toward the condenser lens 22 can be directed downward. Consequently, the lamp unit 20 can assist the optical setting in the condenser lens 22 (optical path from the condensing reference focal point Fc tilts to the lower side of the condenser lens axis) by the positional relationship of the light source unit 21 relative to the condenser lens 22. Therefore, in the lamp unit 20, it is possible to further reduce the amount of adjustment of the curvature of each of the incident surface 33 and the light emission surface 34 for the optical setting in the condenser lens 22, and the optical path from the condenser lens 22 to the shade 23 can be appropriately set with a simpler configuration.

In the condenser lens 22 of the lamp unit 20, the first lens portion 44 and the second lens portion 45 having a symmetrical configuration are adjacent to each other in the width direction. In the lamp unit 20, the two lens portions (44, 45) form different regions (a1 to a4) with the light incident from the curved incident surface section 41 (46, 47) and the light incident from the annular incident surface section 42 (48, 49) and reflected by the reflective surface 43 (51, 52), and these regions are combined to form the irradiation region a1. Therefore, the lamp unit 20 can form four different regions (a1 to a4) by using the difference between the two optical paths (four optical paths in total) of the two lens portions (44, 45) even with the single condenser lens 22, and can form the irradiation region a1 having a desired light flux distribution. In particular, in the lamp unit 20, the first condenser lens axis A5 of the first lens portion 44 is positioned on the fluorescent bodies 31b of the first light source 31A, and the second condenser lens axis A6 of the second lens portion 45 is positioned on the fluorescent bodies 31b of the second light source 31B. Therefore, since the lamp unit 20 can set the difference (feature) of each region (a1 to a4) by using the positions of the two light sources 31 relative to the first lens portion 44 and the second lens portion 45 in addition to the difference of the four optical paths described above, each region can be efficiently formed. Consequently, the lamp unit 20 can easily adjust the light flux distribution on the shade 23, and the irradiation pattern Pi to be formed can be made to have a desired brightness distribution.

In the lamp unit 20, the two light sources 31 each has the two LED chips 31a, the two LED chips 31a are arranged side by side in the width direction, and the fluorescent bodies 31b are made long in the width direction. Here, in the lamp unit 20, the condenser lens 22 causes the shade portion 35 of the shade 23 to condenses light on the lamp unit axis A2 in the width direction and emits this light to the irradiation slit 37 and condenses light on the irradiation slit 37 in the vertical direction. In the lamp unit 20, the condenser lens 22 tilts the optical path from the condensing reference focal point Fc to the lower side of the condenser lens axis of the condenser lens 22. Therefore, in the lamp unit 20, the control of the light from the light sources 31 in the condenser lens 22 requires greater precision in the vertical direction than precision in the width direction. In the lamp unit 20, the two LED chips 31a of each of the light sources 31 are arranged side by side in the width direction so that the fluorescent bodies 31b are long in the width direction. Thus, it is possible to suppress an increase in the size of the light emitting portion of each of the light sources 31 in the vertical direction. For this reason, in the lamp unit 20, the condenser lens 22 can control the light from each light source 31 in a state in which the influence of the aberration in the vertical direction is suppressed, and thus it is possible to obtain a more appropriate light flux distribution for each slit section 38.

Herein, in the conventional vehicle lamp fitting described in the related art document forms the irradiation pattern on the road surface by tilting the lamp unit axis of the lamp unit, which combines the light sources, the light shielding member, and the projector lens, downward toward the road surface. Therefore, in the known vehicle lamp fitting, it is difficult to provide the lamp unit and the signal lamp unit side by side to be combined into a single lamp fitting. This will be described with reference to FIGS. 2 and 16. Here, a problem caused by tilting the lamp unit is similar even in the vehicle lamp fitting 10 of the first embodiment if the lamp unit 20 (lamp unit axis A2) tilts relative to the signal lamp unit 13 (signal lamp unit axis A1). Therefore, FIG. 16 uses the signal lamp unit 13 and the lamp unit 20 like FIG. 2.

First, in the vehicle lamp fitting 10, when two units (signal lamp unit 13 and lamp unit 20) are provided to be combined into a single lamp fitting, a distance between the light emitting parts of the both units, that is, the signal-lamp light-emitting portion 16 and the projector lens 24 (its emission surface 24b) is stipulated by regulations so as to be less than or equal to a predetermined interval d (see FIG. 2). This predetermined interval d is 75 mm. Since the signal lamp unit 13 is used to directly show the signal-lamp light-emitting portion 16, that is, the light emitted from the signal-lamp light-emitting portion 16 to a person around the signal lamp unit 13, and therefore the signal lamp unit axis A1 is provided in parallel with the road surface 2. Therefore, in the vehicle lamp fitting 10, when the lamp unit 20 is tilted downward, as illustrated by the broken line in FIG. 16, the tilted lamp unit 20 interferes with the signal lamp unit 13. In the vehicle lamp fitting 10, when the tilted lamp unit 20 is lowered to such a position as not to interfere with the signal lamp unit 13, as illustrated by the solid line in FIG. 16, an interval d' between the signal-lamp light-emitting portion 16 and the projector lens 24 (emission surface 24b) becomes larger than the predetermined interval d. Therefore, since the lamp unit of the conventional vehicle lamp fitting tilts, the regulations are not met even when the lamp unit is provided side by side to be combined into a signal lamp unit because the lamp unit tilts.

On the other hand, in the vehicle lamp fitting 10, the lamp unit 20 can form the irradiation pattern Pi on the road surface 2 even when the lamp unit axis A2 is parallel to the road surface 2 by positioning the light source unit 21 and the condenser lens 22 above the lamp unit axis A2 and tilting the projector lens 24 (projector lens axis A4) downward around the projection reference focal point Fb. Therefore, in the vehicle lamp fitting 10, the lamp unit 20 and the signal lamp unit 13 can be provided side by side in a state in which the lamp unit axis A2 and the signal lamp unit axis A1 are parallel, as illustrated in FIG. 2, and thereby the signal-lamp light-emitting portion 16 and the projector lens 24 (emission surface 24b) can be disposed with the predetermined interval d (within the regulations). Consequently, in the vehicle lamp fitting 10, the lamp unit 20 and the signal lamp unit 13 are disposed side by side to be combined into a single lamp fitting. This can enhance the flexibility of the position and the manner of mounting the vehicle lamp fitting 10 on the vehicle 1 and improve usability.

The lamp unit 20 and the vehicle lamp fitting 10 of the first embodiment can achieve the following effects.

In the lamp unit 20, the light source unit 21 including a plurality of light sources 31, the condenser lens 22, the light shielding member (shade 23), and the projector lens 24 are arranged along the lamp unit axis A2. In the lamp unit 20, the incident surface 33 of the condenser lens 22 has the curved incident surface section 41 and the annular incident surface section 42, and the condenser lens 22 has the reflective surface 43. In the lamp unit 20, the light sources 31 are disposed such that the emission light axes 31L are positioned above the lamp unit axis A2, and the condenser lens 22 is disposed such that the condenser lens axes (first condenser lens axis A5 and second condenser lens axis A6) are positioned above the lamp unit axis A2. Therefore, even when the lamp unit 20 uses the single condenser lens 22 for the plurality of light sources 31, the light emitted from each light source 31 can be efficiently used, and a desired light flux distribution can be formed on the shade 23.

In the projector lens 24 of the lamp unit 20, the projection reference focal point Fb is set on the lamp unit axis A2, and the projector lens axis A4 is disposed at a position rotated downward around the projection reference focal point Fb so that the projector lens axis A4 is directed below the lamp unit axis A2. Therefore, even when the lamp unit axis A2 is provided parallel to the road surface 2, the lamp unit 20 can project the light passing through the irradiation slit 37 of the light shielding member (shade 23) in the direction of the projector lens axis A4, and can form the irradiation pattern Pi on the road surface 2.

In the condenser lens 22 of the lamp unit 20, the optical paths to the light shielding member (shade 23) tilt downward relative to the condenser lens axis. Therefore, the lamp unit 20 can tilt the traveling direction of the light (light fluxes) passing through the light shielding member downward as a whole, and thus can more appropriately form the irradiation pattern Pi on the road surface 2 on the projector lens axis A4 in cooperation with the projector lens 24 tilted downward.

In the lamp unit 20, the condenser lens 22 has the first lens portion 44 on one side in the width direction and the second lens portion 45 on the other side in the width direction, the first lens portion 44 has the first curved incident surface portion 46, the first annular incident surface portion 48, and the first reflective surface 51, and the second lens portion 45 has the second curved incident surface portion 47, the second annular incident surface portion 49, and the second reflective surface 52. The lamp unit 20 forms the first region a1 with the light from the light sources 31 through the first curved incident surface portion 46 and forms the second region a2 with the light from the light sources 31 through the second curved incident surface portion 47. Therefore, the lamp unit 20 can form two different regions (a1 and a2) by using the difference between the two optical paths passing through the curved incident surface sections (46 and 47) of the two lens portions (44 and 45), and the light flux density can be increased over the entire lower portion of the irradiation slit 37.

The lamp unit 20 forms the third region a3 with the light from the light sources 31 reflected by the first reflective surface 51 through the first annular incident surface portion 48 and forms the fourth region a4 with the light from the light sources 31 reflected by the second reflective surface 52 through the second annular incident surface portion 49. Therefore, the lamp unit 20 can form two different regions (a3 and a4) by using the difference between the two optical paths passing through the annular incident surface sections (48 and 49) and the reflective surfaces (51 and 52) in the two lens portions (44 and 45), and can irradiate the entire region of the irradiation slit 37. The lamp unit 20 then can form four different regions (a1 to a4) by utilizing the above-described differences of the four optical paths in total in the two lens portions (44 and 45), and can form the irradiation region a1 having a desired light flux distribution.

The lamp unit 20 has, as condenser lens axes, the first condenser lens axis A5 corresponding to the first lens portion 44 and the second condenser lens axis A6 corresponding to the second lens portion 45, and has, as the plurality of light sources 31, the first light source 31A whose light emission surface (fluorescent bodies 31*b*) face the first annular incident surface portion 48 and the second light source 31B whose light emitting surfaces (fluorescent bodies 31*b*) face the second annular incident surface portion 49. In the lamp unit 20, the light emitting surfaces (fluorescent bodies 31*b*) of the first light source 31A are disposed on the first condenser lens axis A5, and the light emitting surfaces (fluorescent bodies 31*b*) of the second light source 31B are disposed on the second condenser lens axis A6. Therefore, since the lamp unit 20 can set the difference (feature) of each region (a1 to a4) by using the positions of the two light sources 31 relative to the first lens portion 44 and the second lens portion 45 in addition to the difference of the four optical paths described above, each region can be efficiently formed.

In the lamp unit 20, the first light source 31A is disposed such that the first emission light axis 31LA is positioned on the upper side in the vertical direction relative to the first condenser lens axis A5, and the second light source 31B is disposed such that the second emission light axis 31LB is positioned on the upper side in the vertical direction relative to the second condenser lens axis A6. Therefore, in the lamp unit 20, the traveling direction of the light from the two light sources 31 that travels from the light source unit 21 to the condenser lens 22 can also be downward, and the optical setting in the condenser lens 22 (the optical path from the condensing reference focal point Fc tilts below the condenser lens axis of the lamp unit 20) can be assisted by the positional relationship of the light source unit 21 relative to the condenser lens 22. Consequently, in the lamp unit 20, it is possible to further reduce the amount of adjustment of the curvature of each of the incident surface 33 and the light emission surface 34 for the optical setting in the condenser lens 22, and the optical path from the condenser lens 22 to the shade 23 can be appropriately set with a simpler configuration.

In the lamp unit 20, the second light source 31B is disposed at a position where the first emission light axis 31LA is separated from the first light source 31A in the width direction relative to the first condenser lens axis A5, and the second light source 31B is disposed at a position where the second emission light axis 31LB is separated from the first light source 31A in the width direction relative to the second condenser lens axis A6. Therefore, since the lamp unit 20 has the condenser lens axes (A5 and A6) positioned inward of the emission light axes 31L of the light sources 31 of the light source unit 21 in the width direction, it is possible to assist the four regions (a1 to a4) to appropriately overlap each other on the shade center line Sc.

The vehicle lamp fitting 10 includes the lamp unit 20 described above. Therefore, the vehicle lamp fitting 10 can form the irradiation pattern Pi on the road surface 2 even when the lamp unit 20 is provided such that the lamp unit axis A2 is parallel to the road surface 2. This can enhance the flexibility of the position and the manner of mounting of the vehicle lamp fitting 10 on the vehicle 1 and improve usability.

The vehicle lamp fitting 10 further includes the signal lamp unit 13 with the signal signal-lamp light-emitting portion 16 set on the signal lamp unit axis A1. The lamp unit 20 and the signal lamp unit 13 are positioned adjacent to each other with the lamp unit axis A2 and the signal lamp unit axis A1 parallel to each other. Therefore, the vehicle lamp fitting 10 can bring the signal-lamp light-emitting portion 16 and the projector lens 24 (emission surface 24*b*) close to each other at less than the predetermined interval d (interval specified by regulations), and can form the irradiation pattern Pi on the road surface 2 while arranging the lamp unit 20 and the signal lamp unit 13 side by side and combining the lamp unit 20 and the signal lamp unit 13 into a single lighting tool.

Therefore, the lamp unit (vehicle lamp fitting) according to the first embodiment as the lamp unit 20 (vehicle lamp fitting 10) according to the disclosure can efficiently use light from both the light sources 31 while forming the irradiation pattern Pi with the desired brightness distribution.

Although the vehicle lamp fitting and the lamp unit of the disclosure are described on the basis of the first embodiment, the specific configuration is not limited to the first embodiment, and changes and additions to the design are permissible as long as the changes and the additions do not depart from the gist of the invention according to each claim in the scope of claims.

In the first embodiment, the irradiation pattern Pi is composed of the three irradiation patterns Di, which are V-shaped symbols and are aligned at substantially equal intervals in the direction away from the vehicle 1. However, the irradiation pattern is not limited to the configuration of the first embodiment, as long as the pattern is formed by the shade (light shielding member), the position of the design and the shape of the symbols as the irradiation pattern Di and the number of the irradiation patterns Di may be set appropriately. Each slit section 38 of the shade 23 may have a design, a position where a design is formed, the number, and the like formed according to the set irradiation pattern as appropriate, and is not limited to the configuration of the first embodiment. The vehicle lamp fittings 10 (lamp units 20) are provided at the front portions of the vehicle 1 in the first embodiment. However, as long as the vehicle lamp fittings are provided in the vehicle 1 depending on the positions where irradiation patterns are formed relative to the vehicle 1, the vehicle lamp fittings 10 (lamp units 20) may be disposed in headlight lamp chambers or tail lamp chambers (lamp chambers on the left and right sides of the rear of the vehicle), and are not limited to the configuration of the first embodiment.

In the first embodiment, each light source 31 emits amber-colored light. However, the color of the light emitted from the light sources only needs to be set appropriately in accordance with the installation portion and the content to be conveyed, and is not limited to the configuration of the first embodiment.

Furthermore, in the first embodiment, the shade 23 is used as a light shielding member to allow the light condensed by the condenser lens 22 to pass through the irradiation slit 37. However, the light shielding member may have any other configuration as long as the light shielding member is provided with the irradiation slit 37 that partially passes the light condensed by the condenser lens 22, and is not limited to the configuration of the first embodiment. As another configuration, for example, an irradiation slit that partially transmits light is provided in a plate-like film member that blocks light transmission to obtain a light shielding plate (filter) that transmits, from the irradiation slit, the light that has passed through the condenser lens 22.

In the first embodiment, the vehicle lamp fittings 10 (lamp units 20) are provided in the vehicle 1 that is driven by a driver. However, the vehicle lamp fittings (lamp units) may be provided in a vehicle having an automatic driving function, and are not limited to the configuration of the first embodiment. In this case, the vehicle lamp fittings (lamp units) may form irradiation patterns at timings corresponding to intended use for providing, that is, timings in accordance with some intention regarding operation of the vehicle 1, and are not limited to the configuration of the first embodiment.

In the first embodiment, in the lamp unit 20, the light source unit 21 is provided on the installation base portion 26, which functions as a heatsink, and this installation base portion 26 is connected to the light source housing 25. However, as long as the lamp unit is one that forms an irradiation pattern by condensing light from a light source onto a light shielding member using a condenser lens and projecting the light that passes through the light shielding member using a projector lens, the light source unit may be provided at the end of the housing, or may have other configurations, and is not limited to the configuration of the first embodiment.

In the first embodiment, two light sources 31A and 31B are provided. However, the number and arrangement of the light sources may be appropriately set as long as a plurality of light sources are provided, and are not limited to the configuration of the first embodiment. Here, the light sources are preferably arranged in parallel in the width direction so that the condenser lens 22 can control the light from each light source in a state with the least aberration according to the optical setting in the vertical direction.

In the first embodiment, the lamp unit axis A2 of the lamp unit 20 and the signal lamp unit axis A1 of the signal lamp unit 13 are parallel. However, the lamp unit axis A2 and the signal lamp unit axis A1 do not need to be completely parallel as long as the lamp unit axis A2 and the signal lamp unit axis A1 are substantially parallel. Here, the term "substantially parallel" means that the upper limit of the angle formed by them is three degrees, and preferably one degree or less. Therefore, the lamp unit axis A2 may also be substantially parallel to the road surface 2, that is, may tilt at an upper limit of three degrees.

In the first embodiment, the shade reference axis line A3 of the light shielding member (shade 23) is parallel to the lamp unit axis A2. However, the light shielding member may be disposed to be rotated around a line extending in the width direction through the shade reference point Ps so that the front side (the side of the projector lens 24) in the axial direction of the shade reference axis line A3 is shifted to the lower side, and is not limited to the configuration of the first embodiment. At this time, the shade reference axis line A3 relative to the lamp unit axis A2 is desirably set to be smaller than the tilt of the projector lens axis A4 relative to the lamp unit axis A2, and is preferably set to an angle equal to or smaller than half of the tilt of the projector lens axis A4 relative to the lamp unit axis A2. In this way, since the downward angle can be gradually increased using the light shielding member (shade 23) and the projector lens 24, the direction in which the light fluxes travel more smoothly can be tilted downward.

In the first embodiment, the condenser lens axes (A5 and A6) of the condenser lens 22 is parallel to and the lamp unit axis A2. However, the condenser lens 22 may be rotated so as to shift the light shielding member (shade 23) side of the condenser lens axis (A5 and A6) downward about the lens center point Lc, and is not limited to the configuration of the first embodiment. At this time, the tilt of the condenser lens axis relative to the lamp unit axis A2 is desirably smaller than the tilt of the light shielding reference axis line (shade reference axis line A3) relative to the lamp unit axis A2, and is preferably not more than half the tilt of the light shielding reference axis line relative to the lamp unit axis A2. Thus, it is possible to assist in setting the optical paths from condenser lens 22 to the shade 23 as described above, and it is possible to reduce the amount of adjustment of the curvature of the incident surface 33 and the emission surface 34 for the optical setting in the condenser lens 22.

In the vehicle lamp fitting 10 of the first embodiment, a part of the signal-lamp heat-radiating portion 17 of the signal lamp unit 13 and a part of the installation base portion 26 of the lamp unit 20 are exposed to the outside of the lamp housing 11. However, the vehicle lamp fitting may include the entire signal lamp unit 13 and the entire lamp unit 20 inside the lamp housing 11, and is not limited to the configuration of the first embodiment. In this case, the signal lamp unit 13 and the lamp unit 20 are fixed to the lamp housing 11 via a bracket or the like, so that the signal lamp unit axis A1 and the lamp unit axis A2 can be provided in parallel (substantially parallel).

In the vehicle lamp fitting 10 of the first embodiment, the lamp unit 20 is disposed adjacent to the signal lamp unit 13. However, the vehicle lamp fitting only needs to include the lamp unit 20 having the configuration described above, and is not limited to the configuration of the first embodiment. Since this vehicle lamp fitting can be provided with the lamp unit 20 with the lamp unit axis A2 parallel (substantially parallel) to the road surface 2, the flexibility of the position and the manner of mounting on the vehicle 1 can be enhanced, and usability can be improved. Even in this case, this vehicle lamp fitting can be disposed adjacent to a vehicle lamp fitting including a signal lamp unit such that the signal lamp unit axis and the lamp unit axis A2 are parallel (substantially parallel).

DESCRIPTION OF REFERENCE NUMERALS 10 vehicle lamp fitting
13 signal lamp unit
16 signal-lamp light-emitting portion
20 lamp unit
21 light source unit
22 condenser lens
23 shade (as an example of light shielding member)
24 projector lens
31 light source
31b fluorescent body (as an example of light emitting surface)
31A first light source
31B second light source
31L emission light axis
31LA first emission light axis
31LB second emission light axis
33 incident surface
34 emission surface
37 irradiation slit
41 curved incident surface section
42 annular incident surface section
43 reflective surface
44 first lens portion
45 second lens portion
46 first curved incident surface portion
47 second curved incident surface portion
48 first annular incident surface portion
49 second annular incident surface portion
51 first reflective surface
52 second reflective surface
A1 signal lamp unit axis
A2 lamp unit axis
A4 projector lens axis
A5 first condenser lens axis A6 second condenser lens axis
Fb projection reference focal point
Fc condensing reference focal point
Pi irradiation pattern
Ps shade reference point (as an example of light shielding reference point)

The invention claimed is:

1. A lamp unit comprising:
a light source unit including a plurality of light sources:
a condenser lens that condenses light from the light sources:
a light shielding member that has an irradiation slit partially passing the light condensed by the condenser lens; and
a projector lens that forms an irradiation pattern by projecting the light passing through the light shielding member, wherein,
the light source unit, the condenser lens, the light shielding member, and the projector lens are arrayed on a lamp unit axis,
an incident surface of the condenser lens has a curved incident surface section facing the light sources in a condenser lens axial direction of the condenser lens, and an annular incident surface section surrounding the curved incident surface section,
the condenser lens has a reflective surface surrounding the curved incident surface section,
the light sources are disposed with an emission light axis positioned above the lamp unit axis in a vertical direction, and
the condenser lens is disposed with the condenser lens axis positioned above the lamp unit axis in the vertical direction.

2. The lamp unit according to claim 1, wherein the projector lens is set to have a projection reference focal point on the lamp unit axis and is disposed at a position rotated downward about the projection reference focal point such that a projector lens axis is directed further downward than the lamp unit axis.

3. The lamp unit according to claim 1, wherein the condenser lens tilts an optical path to the light shielding member below the condenser lens axis.

4. The lamp unit according to claim 1, wherein,
the condenser lens includes a first lens portion positioned on one side in a width direction orthogonal to the lamp unit axis on a horizontal plane and a second lens portion positioned on an other side in the width direction,
the curved incident surface section includes a first curved incident surface portion provided in the first lens portion and a second curved incident surface portion provided in the second lens portion,
the annular incident surface section includes a first annular incident surface portion provided in the first lens portion and a second annular incident surface portion provided in the second lens portion,
the reflective surface includes a first reflective surface provided in the first lens portion and a second reflective surface provided in the second lens portion,
in the condenser lens, an entire lower portion of the irradiation slit in the width direction is irradiated with the light from the light sources passing through the first curved incident surface portion to form a light flux distribution having high light flux density in half of the lower portion on the other side in the width direction, and
all of the lower portion in the width direction is irradiated with the light from the light sources passing through the second curved incident surface portion to form a light flux distribution having high light flux density in half of the lower portion on one side in the width direction.

5. The lamp unit according to claim 1, wherein,
the condenser lens includes a first lens portion positioned on one side in a width direction orthogonal to the lamp unit axis on a horizontal plane and a second lens portion positioned on an other side in the width direction,
the curved incident surface section includes a first curved incident surface portion provided in the first lens portion and a second curved incident surface portion provided in the second lens portion,
the annular incident surface section includes a first annular incident surface portion provided in the first lens portion and a second annular incident surface portion provided in the second lens portion,
the reflective surface includes a first reflective surface provided in the first lens portion and a second reflective surface provided in the second lens portion,
the condenser lens forms a light flux distribution for irradiating at least half of the irradiation slit in one side in the width direction with light from the light sources passing through the first annular incident surface portion and being reflected by the first reflective surface, and
the condenser lens forms a light flux distribution for irradiating at least half of the irradiation slit in an other side in the width direction with light from the light sources passing through the second annular incident surface portion and being reflected by the second reflective surface.

6. The lamp unit according to claim 1, wherein,
the condenser lens includes a first lens portion positioned on one side in a width direction orthogonal to the lamp unit axis on a horizontal plane and a second lens portion positioned on an other side in the width direction,
the curved incident surface section includes a first curved incident surface portion provided in the first lens portion and a second curved incident surface portion provided in the second lens portion,
the annular incident surface section includes a first annular incident surface portion provided in the first lens portion and a second annular incident surface portion provided in the second lens portion,
the reflective surface includes a first reflective surface provided in the first lens portion and a second reflective surface provided in the second lens portion,
the condenser lens axis includes a first condenser lens axis corresponding to the first lens portion and a second condenser lens axis corresponding to the second lens portion,
the light sources include a first light source having a light emitting surface facing the first annular incident surface portion and a second light source having a light emitting surface facing the second annular incident surface portion,
the light emitting surface of the first light source is disposed on the first condenser lens axis, and
the light emitting surface of the second light source is disposed on the second condenser lens axis.

7. The lamp unit according to claim 6, wherein,
the first light source has a first emission light axis passing through a center of the light emitting surface, and is disposed such that the first emission light axis is positioned upward relative to the first condenser lens axis in the vertical direction, and the second light source has a second emission light axis passing through a center of the light emitting surface, and is disposed such that the second emission light axis is positioned upward relative to the second condenser lens axis in the vertical direction.

8. The lamp unit according to claim 7, wherein,
the first light source is disposed such that the first emission light axis is positioned away from the second light source in the width direction relative to the first condenser lens axis, and
the second light source is disposed such that the second emission light axis is positioned away from the first light source in the width direction relative to the second condenser lens axis.

9. A vehicle lamp fitting comprising the lamp unit according to claim 1.

10. The vehicle lamp fitting according to claim 9 further comprising:
a signal lamp unit having a signal-lamp light-emitting portion set on a signal lamp unit axis, and
wherein the lamp unit and the signal lamp unit are disposed adjacent to each other with the lamp unit axis and the signal lamp unit axis parallel to each other.

* * * * *